United States Patent [19]

Maruyama et al.

[11] Patent Number: 5,366,026
[45] Date of Patent: Nov. 22, 1994

[54] IMPACT TYPE CLAMPING APPARATUS

[75] Inventors: Junichi Maruyama; Teruo Fukumura, both of Yokohama; Toru Takeuchi, Zushi, all of Japan

[73] Assignee: Nissan Motor Company, Ltd., Yokohama, Japan

[21] Appl. No.: 112,362

[22] Filed: Aug. 27, 1993

[30] Foreign Application Priority Data

Aug. 28, 1992 [JP] Japan .................. 4-254028
Sep. 7, 1992 [JP] Japan .................. 4-238609
Sep. 7, 1992 [JP] Japan .................. 4-238616

[51] Int. Cl.5 .................. B25B 23/14; B23P 19/06
[52] U.S. Cl. .................. 173/180; 173/181; 81/467; 29/407; 73/761; 73/862.23
[58] Field of Search .............. 173/176, 177, 178, 180, 173/181, 182, 183; 29/407, 240; 81/467, 470; 73/761, 862.23, 862.24; 364/508

[56] References Cited

U.S. PATENT DOCUMENTS

| 4,142,591 | 3/1979 | Himmelstein | 173/182 |
| 4,244,245 | 1/1981 | Wallace et al. | 173/180 |
| 4,274,188 | 6/1981 | Eshghy . | |
| 4,361,945 | 12/1982 | Eshghy . | |
| 4,418,765 | 12/1983 | Mori et al. | 173/182 |
| 4,620,450 | 11/1986 | Yamaguchi . | |
| 4,864,903 | 9/1989 | Bickford et al. . | |
| 4,987,669 | 1/1991 | Makimae et al. . | |
| 5,105,519 | 4/1992 | Doniwa . | |
| 5,154,242 | 10/1992 | Soshin et al. | 173/180 |
| 5,181,575 | 1/1993 | Maruyama et al. . | |

FOREIGN PATENT DOCUMENTS 4-109867  9/1992  Japan .

Primary Examiner—Scott A. Smith
Attorney, Agent, or Firm—Lowe, Price, LeBlanc & Becker

[57] ABSTRACT

In an impact type clamping apparatus including a motor unit for generating a pulsatory driving torque, a main spindle driven by said pulsatory driving torque to rotate a fastening member, a detecting unit for detecting a pulsatory torque applied to the main spindle, a calculating circuit for calculating a clamping force in accordance with a peak value of the pulsatory torque, and a control unit for stopping the operation of said motor unit when the calculated clamping force exceeds a desired clamping force, said clamping force is calculated not only from the peak value of the pulsatory torque but also from an increasing coefficient which represents a relationship between the peak value of the pulsatory torque and an increment of the clamping force. The increasing coefficient is gradually decreased in accordance with the increase in the clamping force, so that the clamping force can be calculated very accurately and the fastening member can be clamped with an actual clamping force which is very close to the desired clamping force.

20 Claims, 33 Drawing Sheets

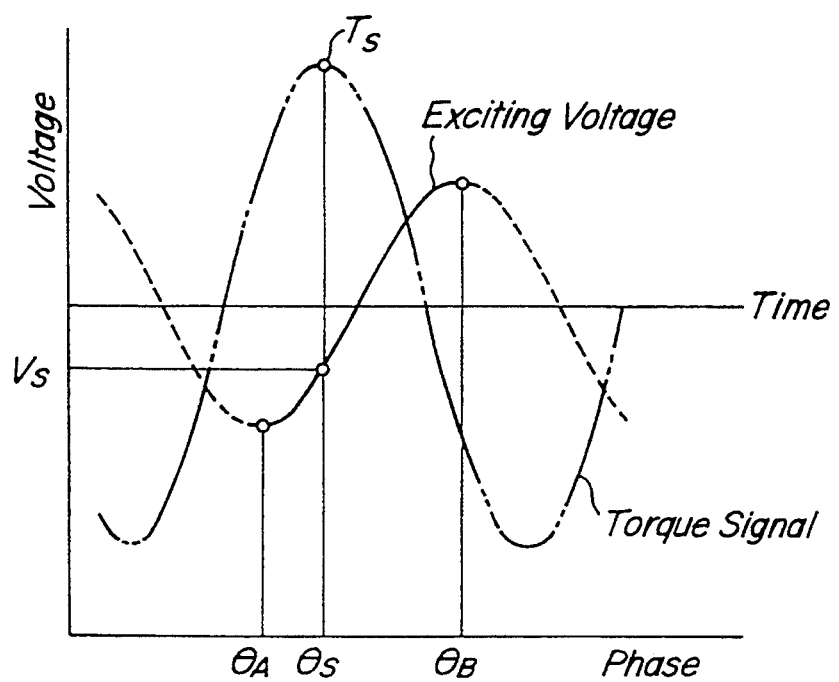
FIG_6

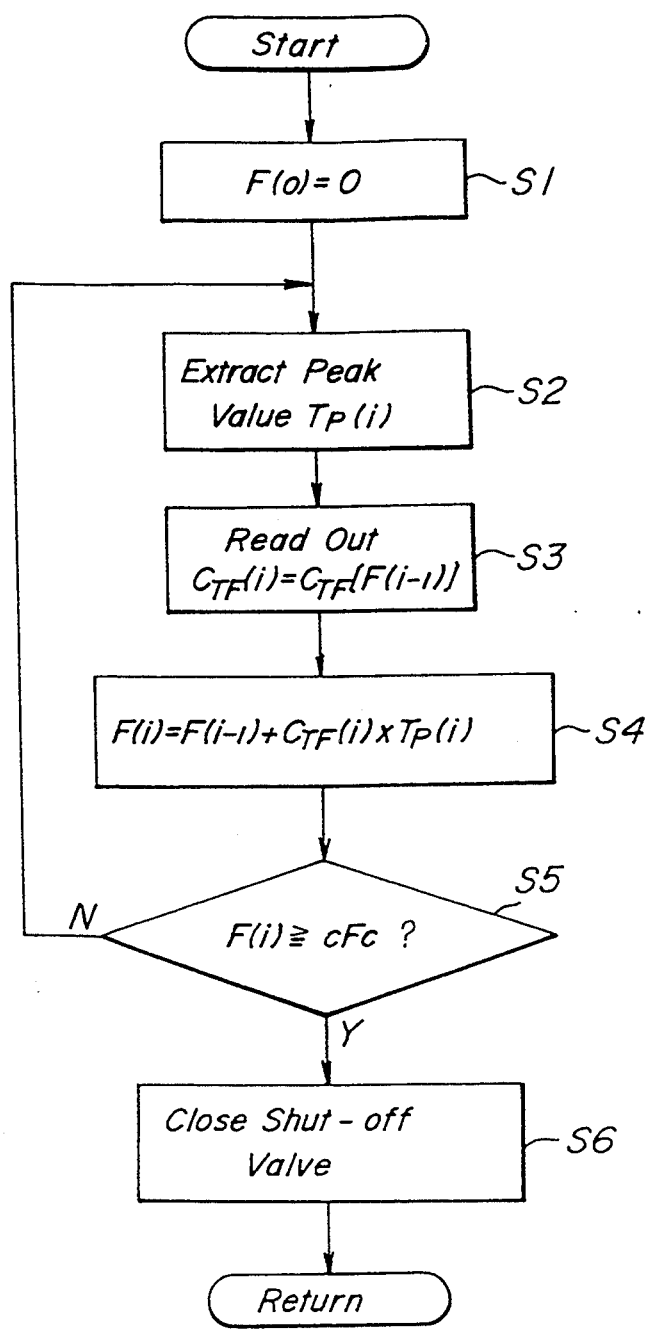
FIG_7

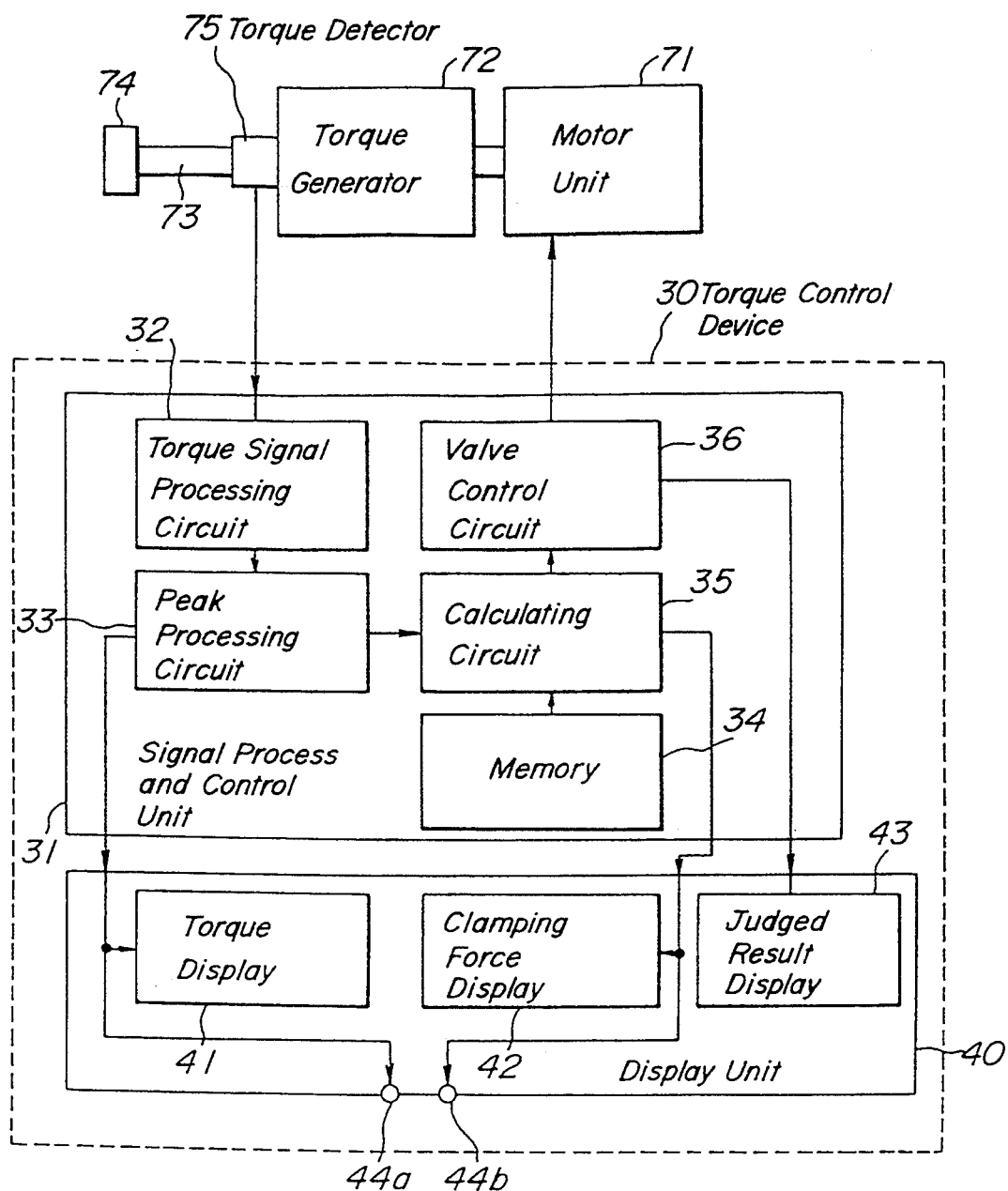
FIG_9

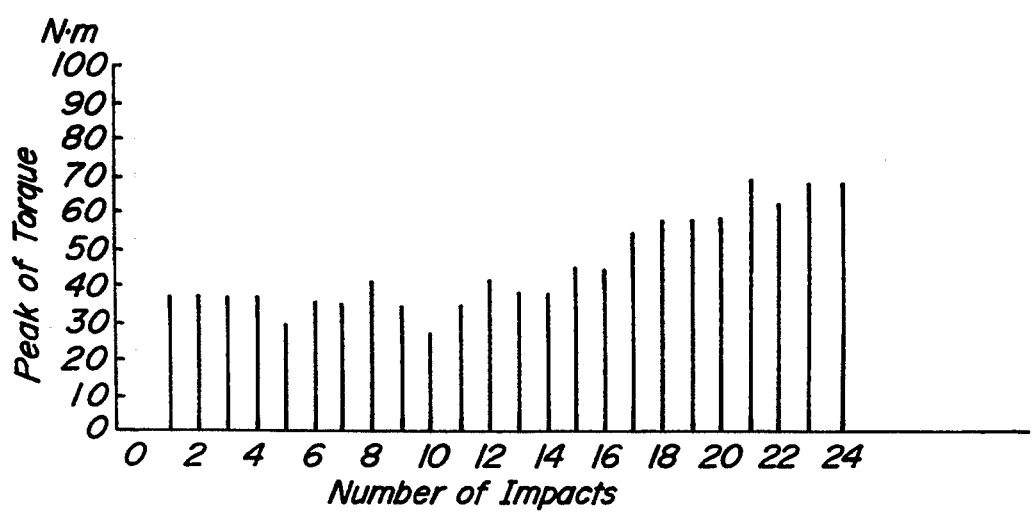
FIG_10

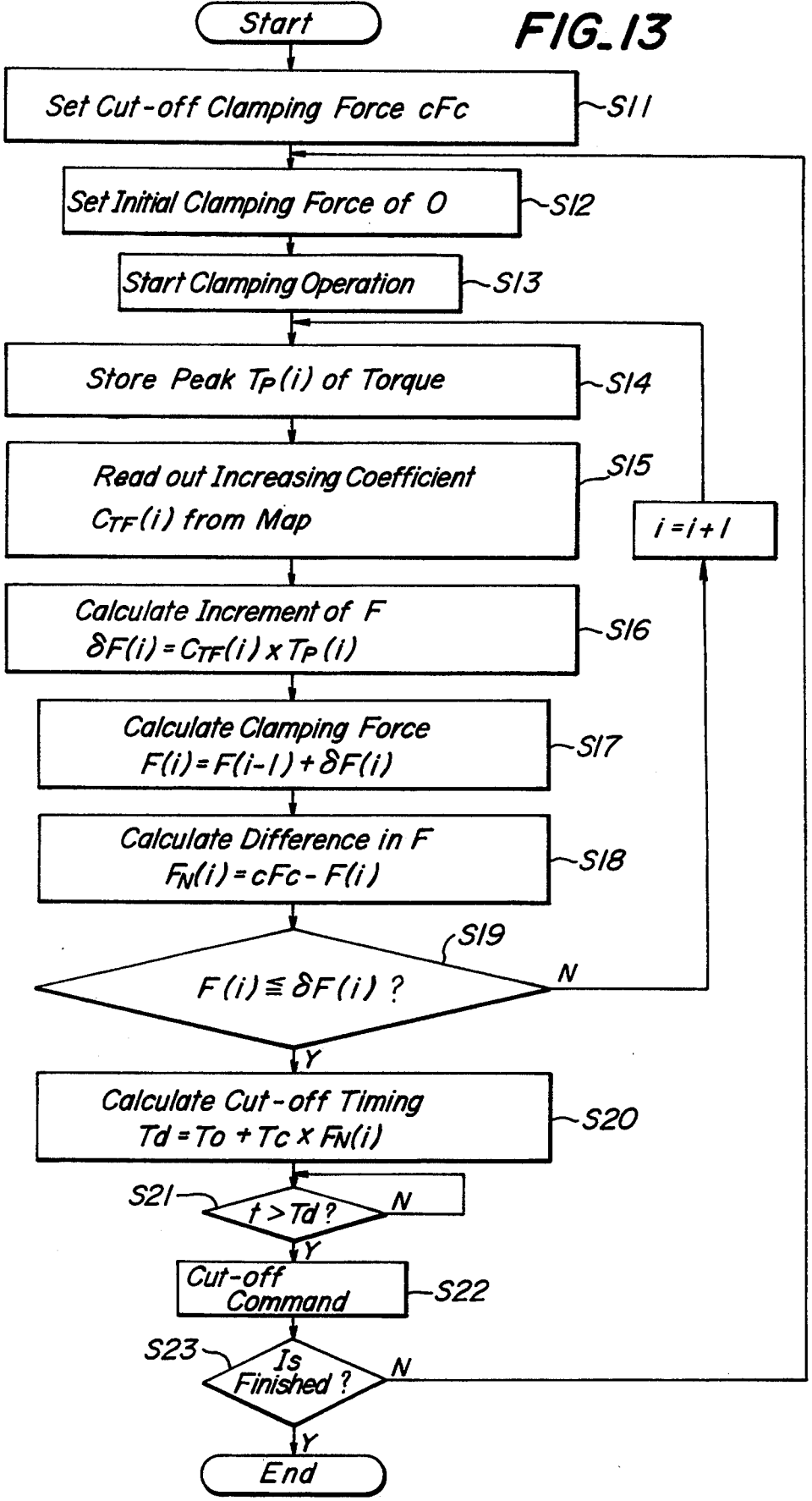

FIG_14
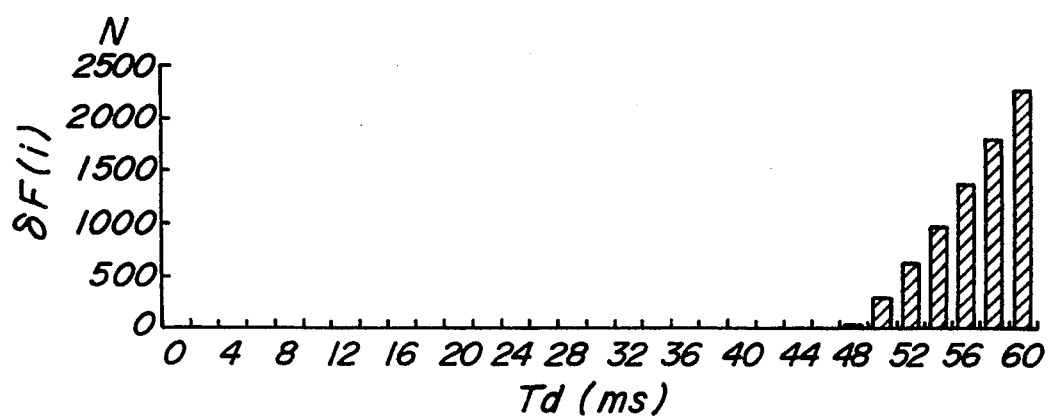
FIG_15
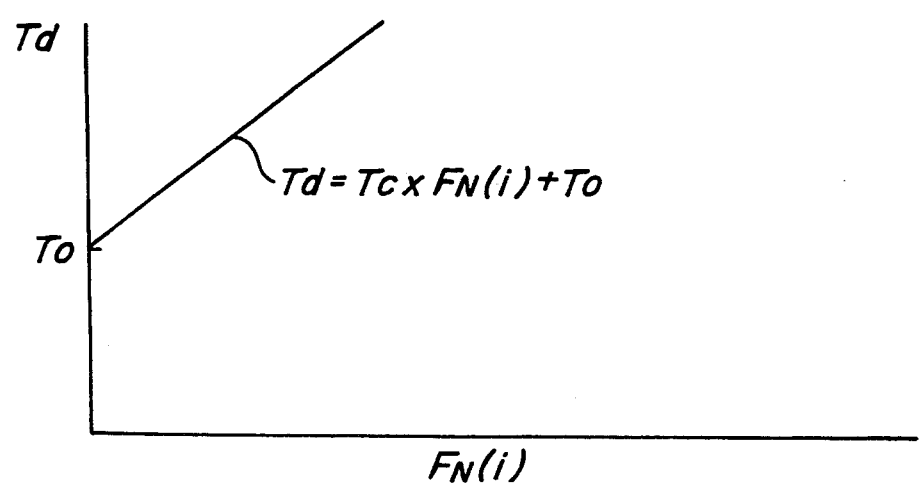

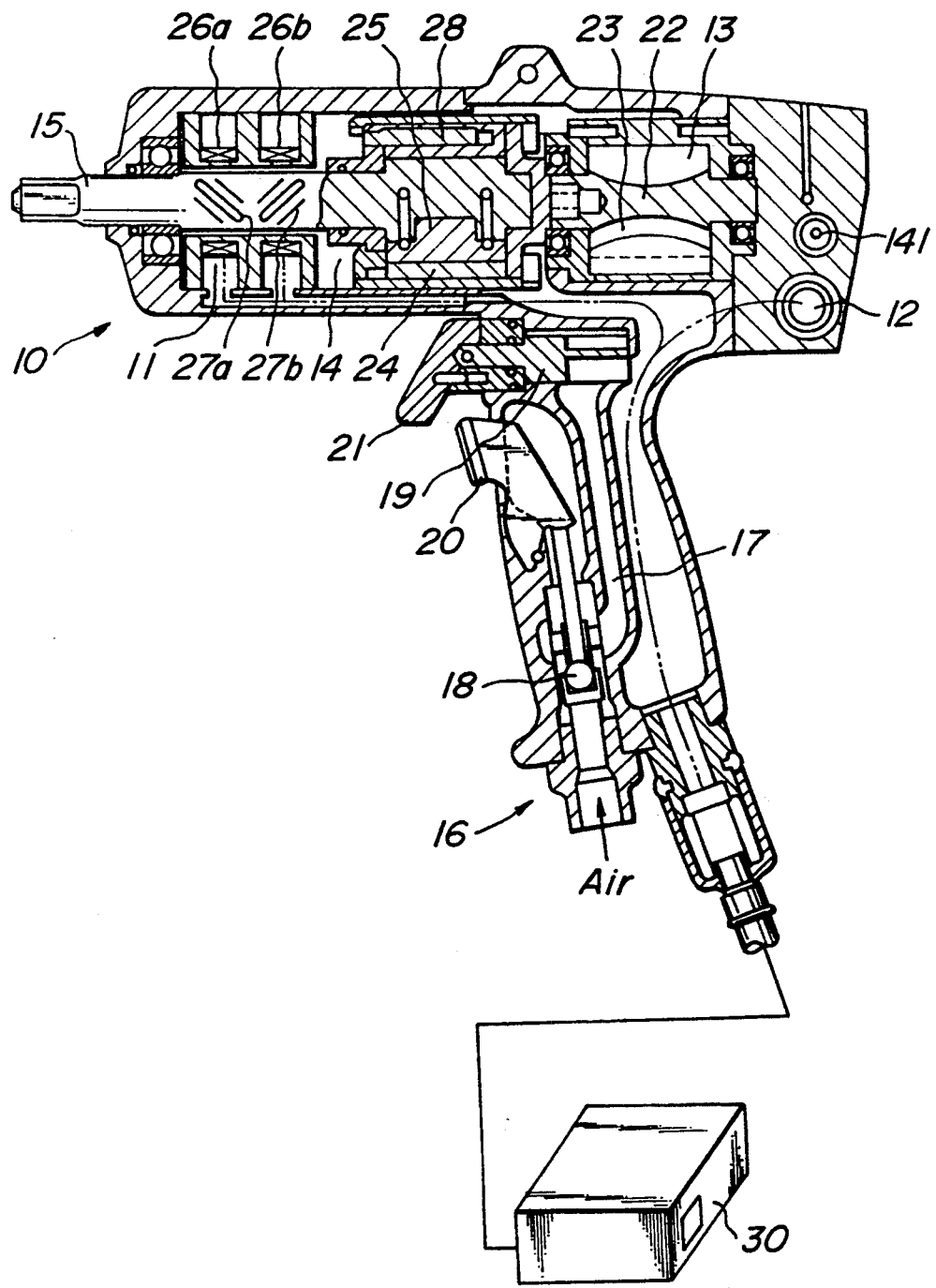
FIG_16

FIG_17
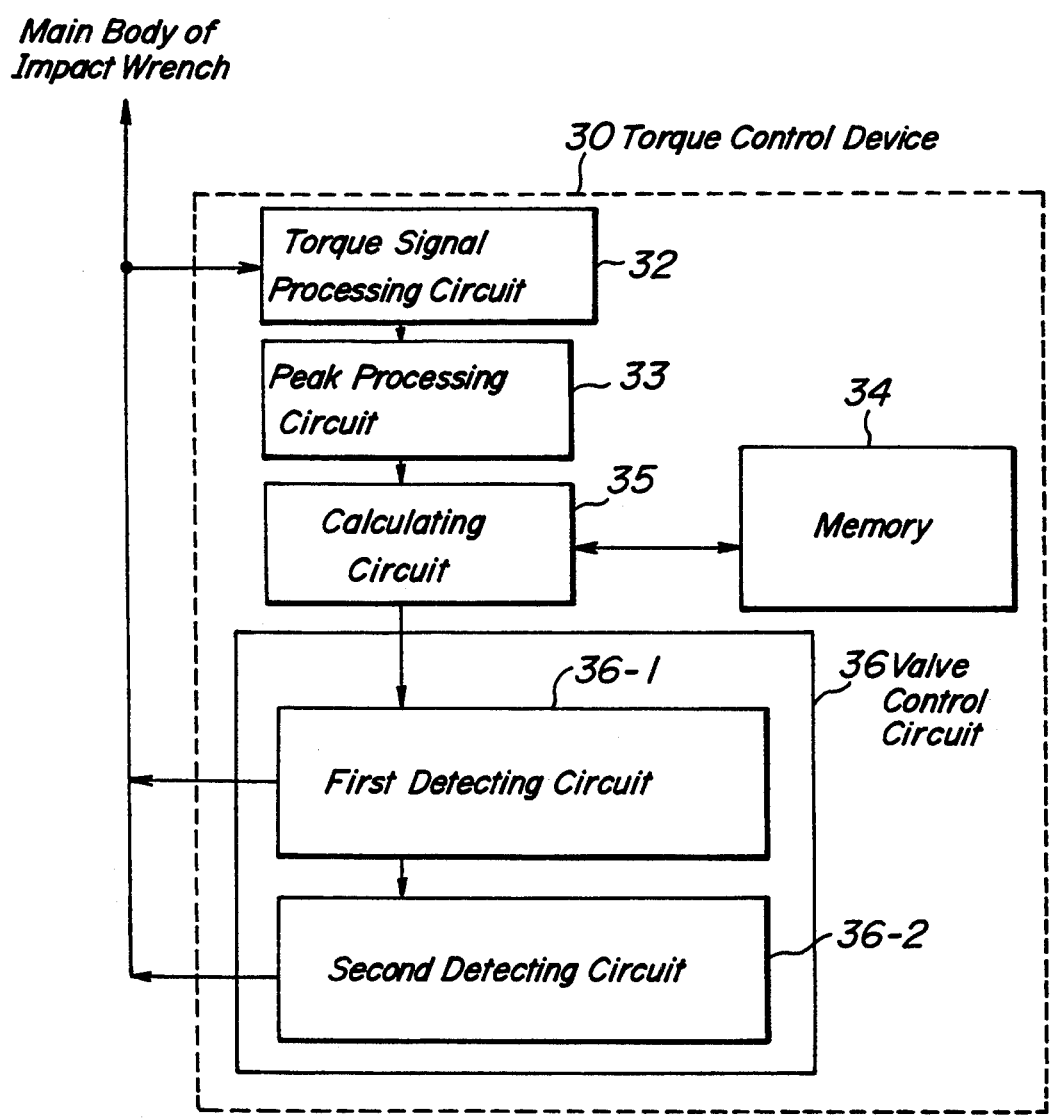

FIG_20

FIG_24

FIG_27

FIG_35
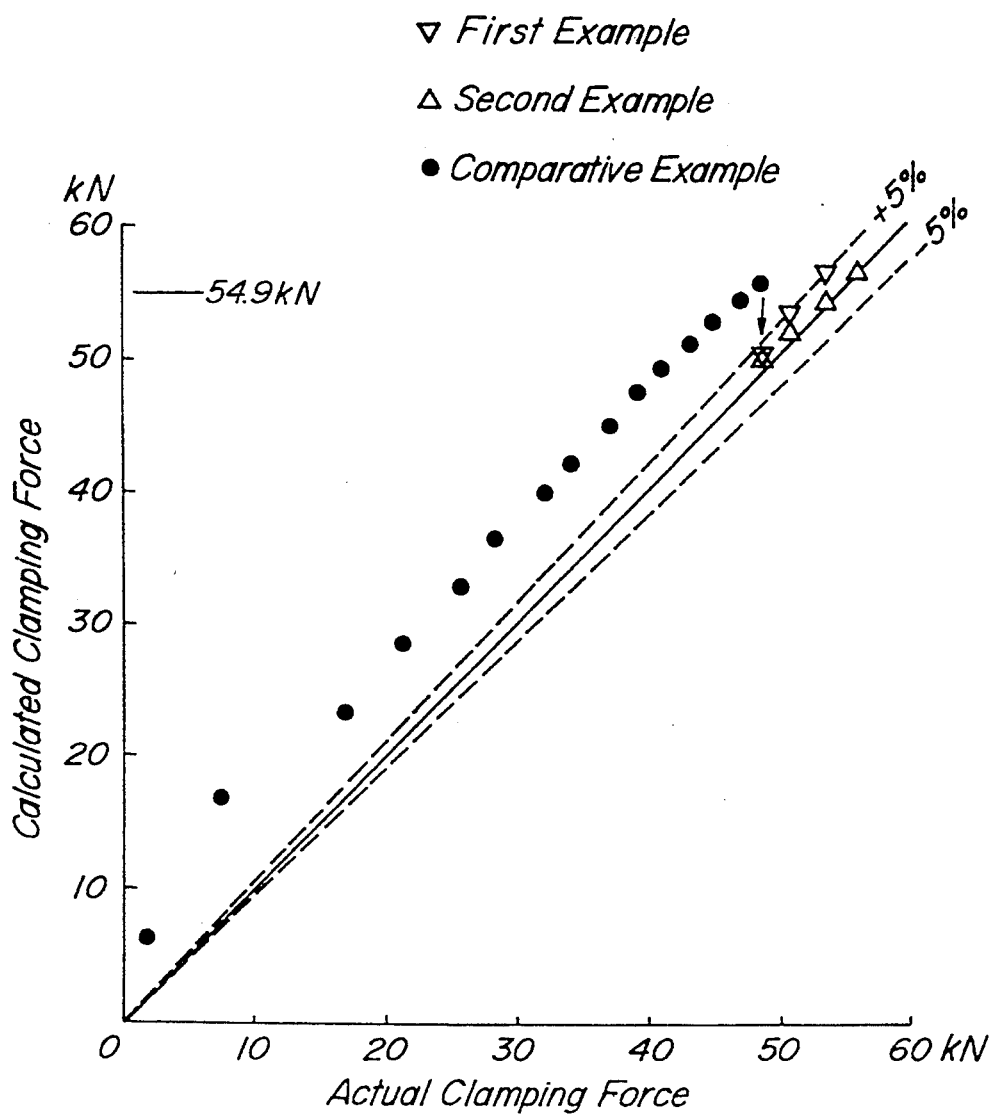

5,366,026

IMPACT TYPE CLAMPING APPARATUS

BACKGROUND OF THE INVENTION

FIELD OF THE INVENTION

The present invention relates to an impact type clamping apparatus such as an impact wrench and an impact type nut runner, and more particularly to an impact type clamping apparatus in which a clamping force with which a fastening member such as bolt and nut is clamped can be detected accurately.

An impact wrench having a clamping force controlling faculty has been known and has been described in, for instance U.S. Pat. No. 5,181,575 issued on Jan. 26, 1993. In this known impact wrench, a main spindle is made of material having a magneto strictive effect and a distortion of the main spindle is detected by a pair of coils arranged in opposition to the main spindle to measure a pulsatory torque applied to the main spindle. When the detected pulsatory torque exceeds a predetermined threshold value, a control circuit supplies a cut-off signal to a shut-off valve so that a supply of a compressed air to an air motor unit is stopped. Then, the operation of an oil pulse generating unit producing the pulsatory torque is stopped and the rotation of the main spindle is stopped.

In a torque wrench such as a taper beam wrench, a clamping force actually applied to bolts and nuts is in proportion to a clamping force produced by the main spindle. However, in the above mentioned impact wrench, a peak value of a pulsatory torque is not in proportion to the clamping force actually applied to bolts and nuts. For instance, even when a pulsatory torque having a peak value smaller than that of a preceding pulsatory torque is generated, it has been experimentally confirmed that a clamping force with which the bolts and nuts are actually clamped is often increased. In this manner, the peak value of the pulsatory torque is not proportional to the actual clamping force, so that even if the peak value of the pulsatory torque is detected in an accurate manner, it is impossible to detect the actual clamping force accurately and the actual clamping force could not be controlled precisely by controlling the shut-off valve in accordance with the detected peak value of the pulsatory torque.

SUMMARY OF THE INVENTION

The present invention has for its object to provide a novel and useful impact type clamping apparatus, in which a clamping force actually applied to fastening members such as bolts and nuts can be detected very accurately, so that the actual clamping force can be controlled in a precise manner.

According to the invention, an impact type clamping apparatus comprises:
- a motor unit for generating a pulsatory driving torque;
- a switching means for switching on and off said motor unit;
- a main spindle driven by said pulsatory driving torque generated by said motor unit for rotating a fastening member;
- a torque detecting means for detecting a pulsatory torque applied to said main spindle to produce a torque signal;
- a calculating means for receiving said torque signal and calculating a clamping force in accordance with a peak value of a pulsatory torque applied to the main spindle and detected by said torque detecting means and a dependency of an increasing coefficient which represents an increasing rate of a clamping force applied to the fastening member by a unit amount of said peak value of the pulsatory torque upon said clamping force to derive a calculated clamping force; and
- a controlling means for performing a predetermined control in accordance with said calculated clamping force generated by said calculating means.

After conducting various experiments and analyses for the actual clamping force produced by the pulsatory torque, the inventors have found that there is existent a predetermined relationship between the peak value of the pulsatory torque applied to the main spindle and the actual clamping force with which the fastening member is clamped for respective combinations of fastening members such as bolt and nut, members to be clamped by the fastening members and impact type clamping apparatuses to be used. Therefore, when the clamping force is calculated from the peak value of the pulsatory torque in accordance with the above relationship, it is possible to detect the actual clamping force in a very accurate manner.

BRIEF DESCRIPTION OF THE DRAWINGS

FIG. 6 is a graph showing signal waveforms for explaining a manner of extracting a peak value of a pulsatory torque;

FIG. 7 is a flow chart explaining the operation of the impact wrench of FIG. 2;

FIG. 9 is a view showing an embodiment of a nut runner according to the invention;

FIG. 10 is a graph showing a variation of a peak value of a pulsatory torque for respective impacts;

FIG. 13 is a flow chart representing the operation of the second embodiment of the impact wrench;

FIG. 14 is a graph showing a relationship between an increment in the clamping force and a shut-off timing;

FIG. 15 is a graph representing a manner of determining the shut-off timing;

FIG. 16 is a cross sectional view illustrating the main body of an embodiment of the impact wrench according to the invention;

FIG. 17 is a block diagram showing a construction of the torque control device of the impact wrench shown in FIG. 16;

FIG. 35 is a graph representing a relationship between the calculated clamping force and the actual clamping force.

DETAILED EXPLANATION OF THE PREFERRED EMBODIMENTS

Figure 1:
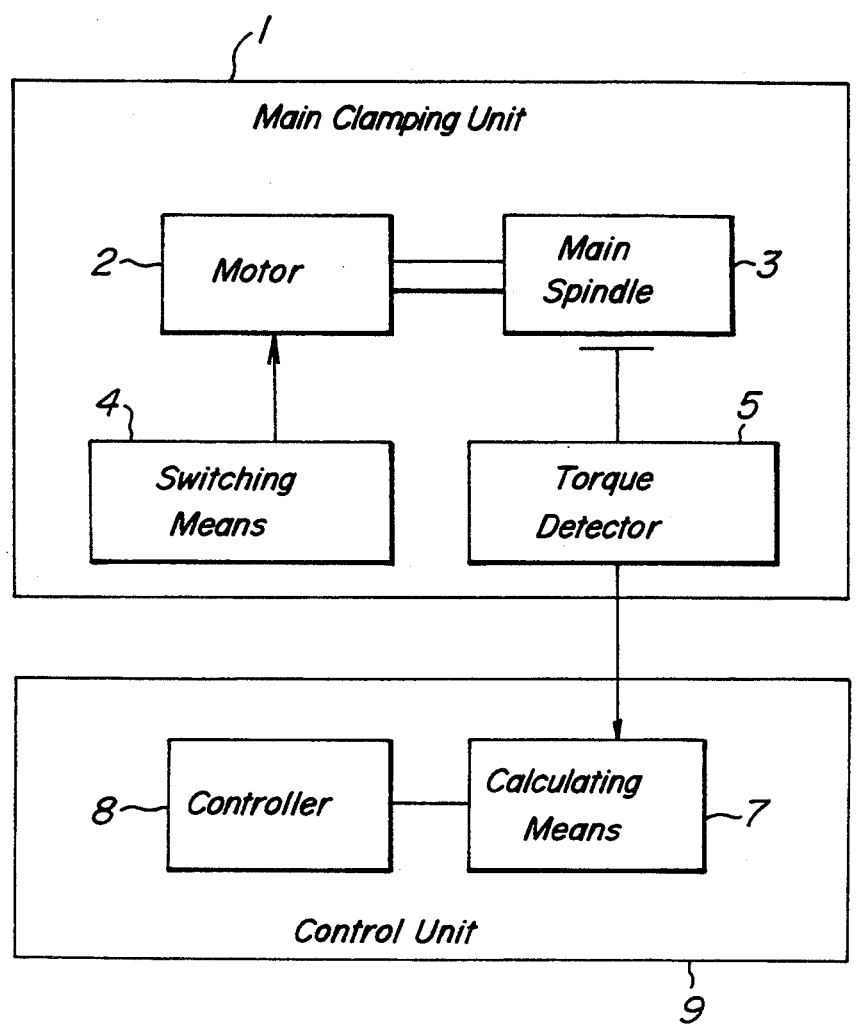
FIG. 1 is a block diagram showing a principal construction of the impact type clamping apparatus according to the invention.

FIG. 1 is a block diagram illustrating a principal construction of the impact type clamping apparatus according to the invention. The apparatus comprises an impact type main clamping unit 1 including a motor 2 for generating a pulsatory torque as a driving output, a main spindle 3 driven by said pulsatory torque generated by said motor, a switching means 4 for making said motor on and off and a torque detecting means 5 for detecting a torque applied to the main spindle to produce a torque signal, and a control unit 9 including a calculating means 7 for processing the torque signal generated by said torque detecting means to derive a peak value of a pulsatory torque applied to said main spindle, calculating a clamping force from said peak value of the pulsatory torque in accordance with a relationship which represents a dependency of an increasing coefficient of the clamping force per a unit amount of the peak value of the pulsatory torque upon the clamping force, and generating a control command in accordance with the thus calculated clamping force, and a control means 8 for performing a given control in accordance with said control command generated by sad calculating means 7.

In the impact type clamping apparatus according to the invention, the clamping force is calculated not only from the peak value of the pulsatory torque, but also from the dependency of the increasing coefficient of the clamping force per a unit amount of the peak value of the pulsatory torque upon the clamping force which is calculated as the clamping force which has been applied to the fastening member until that time, and therefore the clamping force can be detected very accurately. When the operation of the main clamping unit 1 of the impact type clamping apparatus is controlled in accordance with the thus detected clamping force, the fastening member such as bolt and nut can be actually clamped with a clamping force which is very close to a desired or predetermined clamping force.

Figure 2:
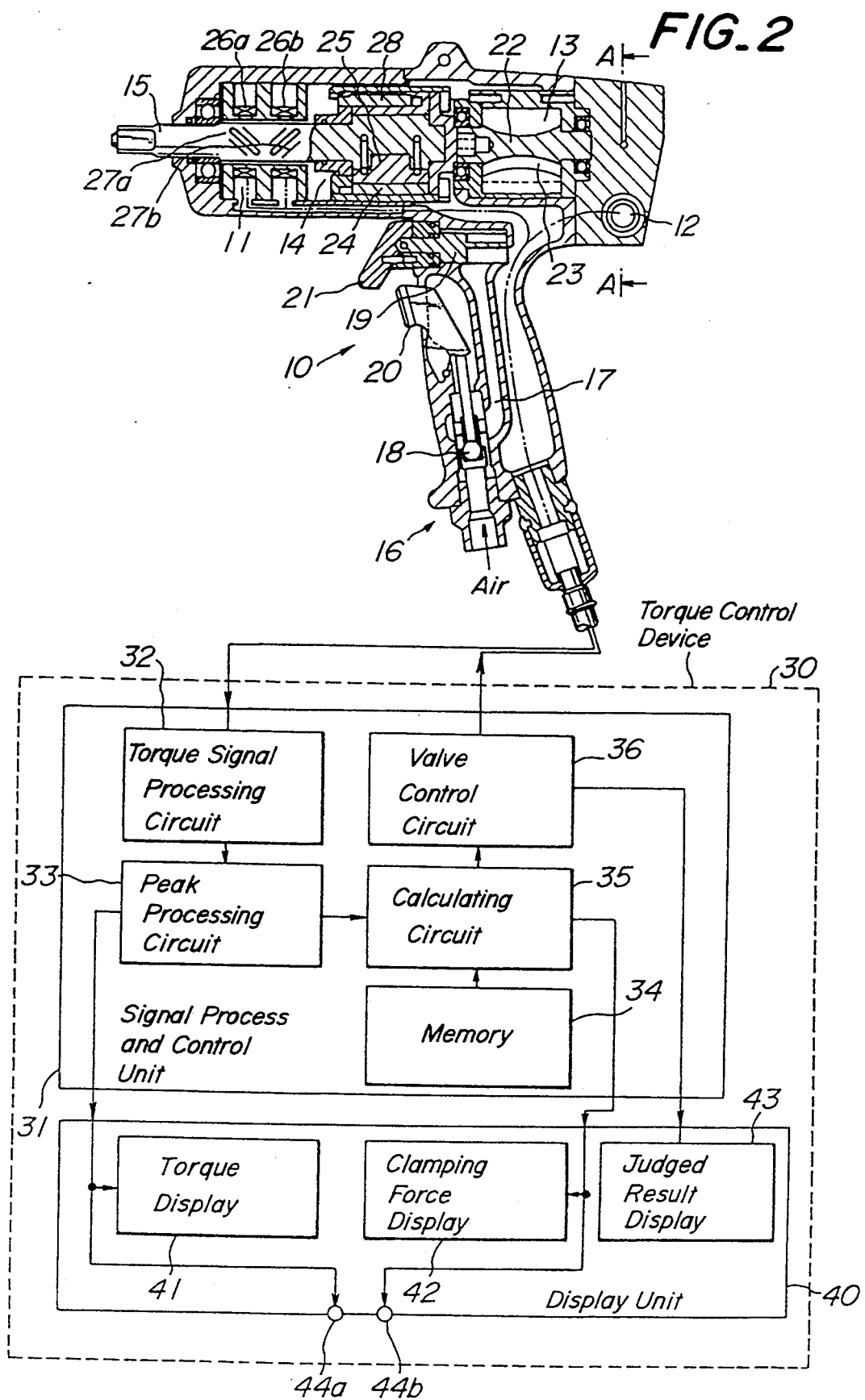
FIG. 2 is a cross sectional view illustrating a construction of a main body of an embodiment of the impact wrench according to the invention.

FIG. 2 shows an embodiment of the impact type clamping apparatus according to the invention. In the present embodiment, the apparatus is formed as an impact wrench. A reference numeral 10 denotes a main body of the impact wrench. The main body 10 comprises air supply unit 16, air motor unit 13, oil pressure pulse generating unit 14 and torque detecting unit 11. The air supply unit 16, air motor unit 13 and oil pressure pulse generating unit 14 have the conventional construction, and in the air supply unit 16 there is formed an air conduit 17 communicated with the air motor unit 13. In this air conduit 17, there are provided a main valve 18 and a rotational direction changing valve 19 in this order viewed in a direction in which a compressed air is supplied to the air motor unit 13.

The main valve 18 is opened by pulling a valve operating lever 20 and the rotational direction changing valve 19 is driven by rotating a rotational direction changing lever 21 into a given rotational position. The air motor unit 13 comprises a rotary driving shaft 22 which is arranged in an eccentric cylinder and is rotated by projecting an air stream against vanes 23 secured to the rotary driving shaft 22. The oil pressure pulse generating unit 14 comprises a liner casing 24 directly coupled with the shaft 22, a liner arranged within the liner casing and secured to the liner casing, and a driving blade 25 rotatably arranged within an inner space of the liner 24. The liner casing 24 is filled with an oil.

When a torque having a level exceeding a predetermined value is not applied to the main spindle 15, the main spindle is rotated together with the liner casing 24 due to a friction between the inner wall of the liner casing and the driving blade 25. When a torque exceeding the predetermined value is applied to the main spindle 15, the oil pressure applied to the inner wall of the driving blade 25 via a relief valve 28 is changed, so that the main spindle 15 is rotated by a very strong impact force. In this manner, the oil pressure pulse generating unit 14 serves to convert the torque generated by the air motor unit 13 into a pulsatory torque which is applied to the main spindle 15.

The torque detecting unit 11 comprises a pair of coils 26a and 26b which are arranged around the main spindle 15 and are secured to an inner wall of a housing of the main unit 10. The main spindle 15 is made of material having the magneto strictive effect, and first and second arrays of recesses 27a and 27b are formed on the outer surface of the main spindle. The coils 26a and 26b are arranged such that they are opposed to the first and second arrays of recesses 27a and 27b, respectively. Therefore, when the torque having a given direction is applied to the main spindle 15, one of the recesses is stretched and the other is compressed, so that the variation of the permeability of the surface portion of the main spindle can be detected in a differential manner. In this manner, the torque applied to the main spindle 15 can be detected at a high sensitivity in a non-contact manner.

The mechanism for cutting the supply of the compressed air to the air motor unit 13 is well known and comprises a shut-off valve 12 for controlling the supply of the compressed air to the air motor unit 13, said shut-off valve being provided in the air conduit between the rotational direction changing valve 19 and the air motor unit.

Figure 3:
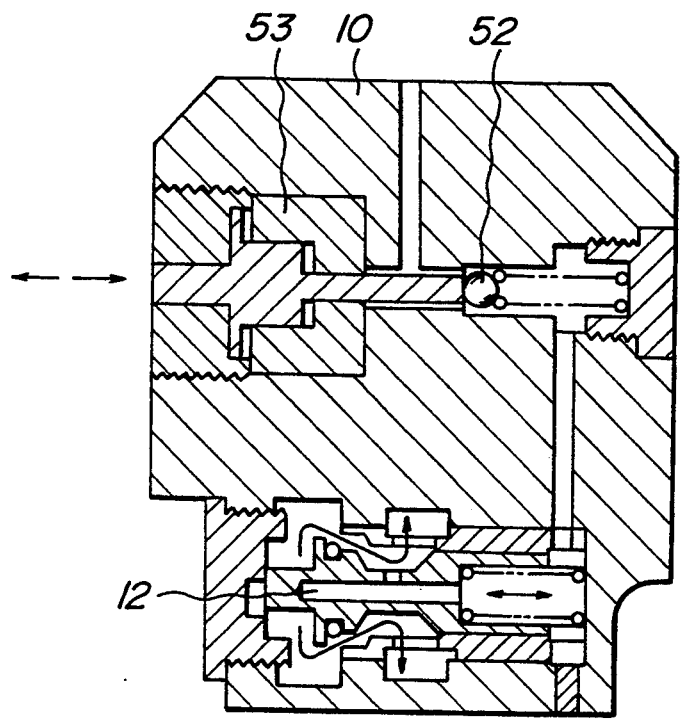
FIG. 3 is a cross sectional view cut along a line A—A in FIG. 2 depicting a construction of a shut-off valve.

FIG. 3 is a cross sectional view cut along a line A—A in FIG. 2 and shows the construction of the shut-off valve 12. In FIG. 3, a reference numeral 52 denotes a pilot valve of an electromagnetic solenoid type and a reference numeral 53 represents an electromagnet. The shut-off valve 12 is driven into on and off in conjunction with the pilot valve 52.

Figure 4:
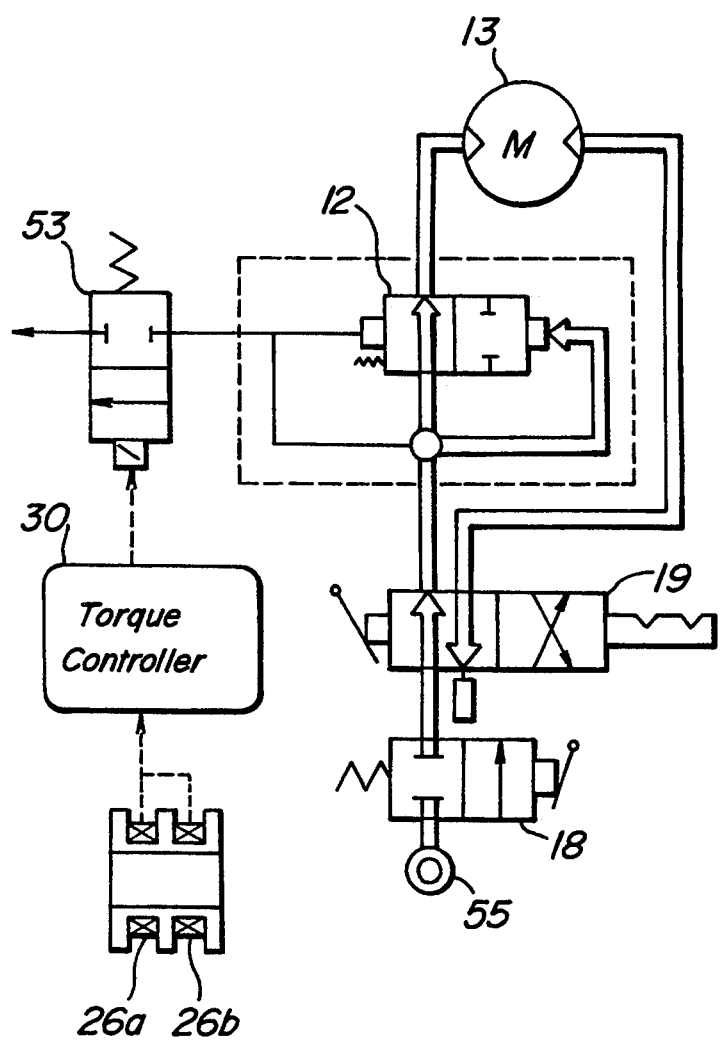
FIG. 4 is a schematic view showing a construction of a fluid circuit of the impact wrench shown in FIG. 2.

FIG. 4 is an air circuit diagram of the impact wrench shown in FIG. 2. When the valve operating lever 20 is pulled, the compressed air is supplied from a compressed air supply source 55 to the air motor unit 13 by means of the main valve 18, rotational direction changing valve 19 and shut-off valve 12, and the rotary driving shaft 22 of the air motor unit 13 is rotated in a given direction determined by the rotational position of the rotational direction changing lever 21. As explained above, the torque applied to the main spindle 15 is detected by the coils 26a and 26b and when the detected torque exceeds a threshold value, a torque control device 30 generates a valve cut command. Then, the pilot valve 52 is opened in response to the valve cut-off command and the shut-off valve 12 is operated to cut-off the supply of the compressed air to the air motor unit 13 and the rotation of the main spindle 15 is stopped.

As shown in FIG. 2, the torque control device 30 comprises a signal process and control unit 31 and a display unit 40 for displaying output signals supplied from the signal process and control unit 31. The signal process and control unit 31 comprises a torque signal processing circuit 32 for generating a torque signal from the output signal supplied from the torque detecting unit 11, a peak processing circuit 33 for extracting a peak value of the pulsatory torque signal supplied from the torque signal processing circuit 32, a calculating circuit 35 for calculating the clamping force, a valve control circuit 36 for judging whether or not the calculated torque is within a predetermined normal range and producing a control signal for the shut-off valve 12, and a memory 34 for storing a function representing a relationship between an increasing coefficient of the clamping force per a unit amount of the peak value of the pulsatory torque and the clamping force.

Figure 5:
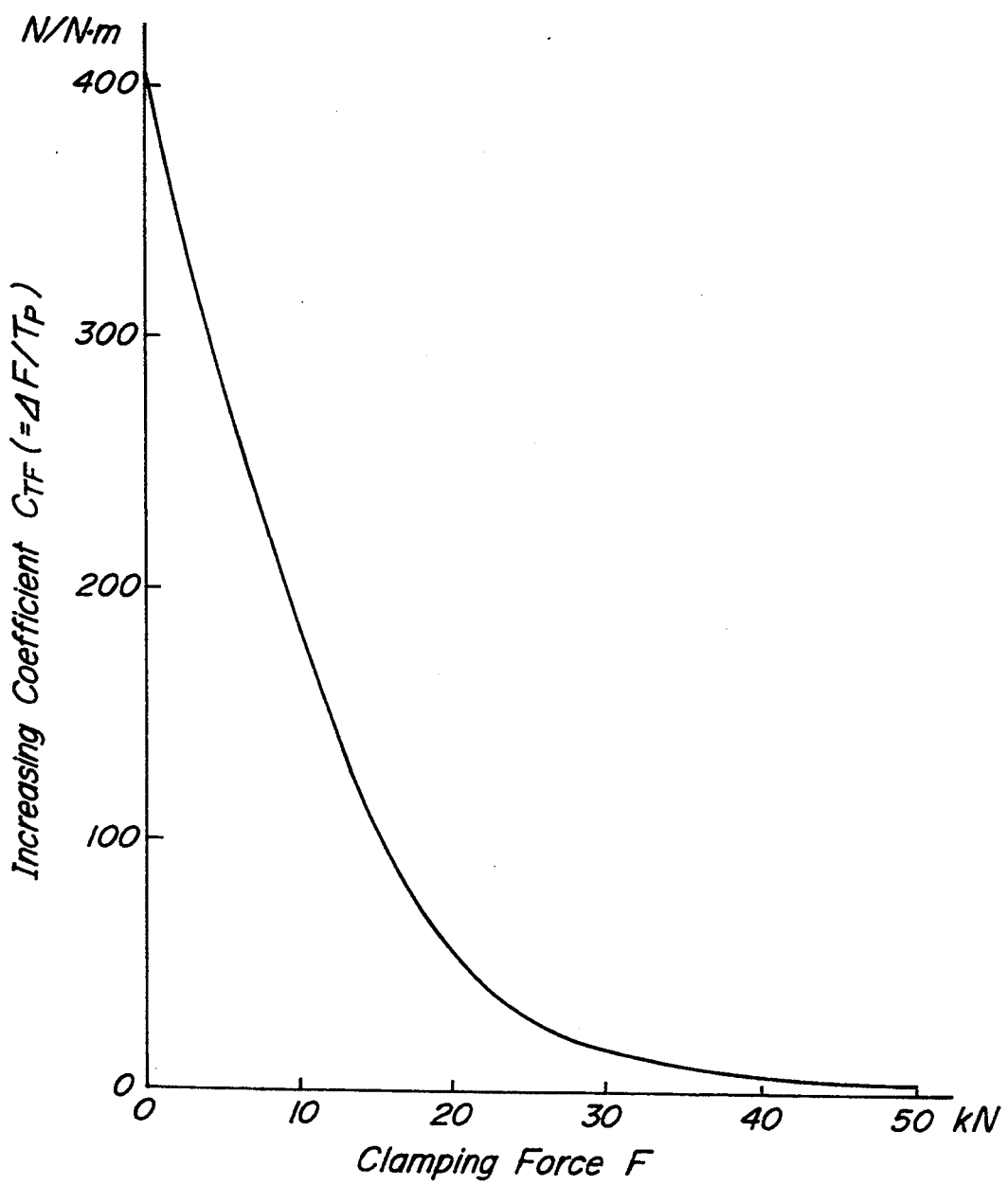
FIG. 5 is a graph representing a variation of an increasing coefficient with respect to the clamping force.

FIG. 5 is a graph showing an embodiment of the function representing the relationship between the increasing coefficient and the clamping force. When a pulsatory torque having a certain peak value is applied to the main spindle 15 under a condition that the clamping force F is small, an increasing amount of the clamping force due to this pulsatory torque is high, but when the clamping force F is already high, an increasing amount of the clamping force produced by the same pulsatory torque is small. That is to say, an increasing coefficient $C_{TF}$ of the clamping force due to the pulsatory torque is decreased substantially exponentially in accordance with the increase in the clamping force F. The function representing the variation of the increasing coefficient of the clamping force may vary for respective combinations of fastening members such as bolts and nuts, substances to be clamped and impact wrenches to be used. Therefore, it is convenient to store a plurality of functions in the memory 34 and any desired one is used in accordance with a combination of a fastening member, a substance to be clamped and an impact wrench to be used. In the clamping force calculating circuit 35, the clamping force is calculated on the basis of the peak value of the pulsatory torque and the increasing coefficient in a manner to be explained later.

In the torque signal process circuit 32, the torque signal supplied from the torque detecting unit 11 is sampled and held at a predetermined phase point on an exciting signal having a sinusoidal waveform to derive an analog output signal. FIG. 6 is a graph showing the operation of this sampling. As shown in FIG. 6, the torque output signal generated by the torque detecting unit 11 is shifted from an exiting current supplied to the coils 26a, 26b by a constant phase angle which is not dependent upon the torque value. In the torque signal processing circuit 32, the exciting current is first converted into an exciting voltage which increases monotonously between a minimum value and a maximum value appearing at phase points $\theta_A$ and $\theta_B$, respectively, and a sampling phase point $\theta_S$ is set between the phase points $\theta_A$ and $\theta_B$ such that the exciting voltage arrives at a voltage value $V_s$. Then, a peak $T_p(i)$ of the torque detection signal can be always sampled and held.

The display unit 40 comprises a torque display unit 41 for displaying the torque value, i.e. the output signals of the peak processing circuit 33, a clamping force display unit 42 for displaying the clamping force calculated by the clamping force calculating circuit 35 and a judged result display unit 43 for displaying a judged result. These display units 41, 42 and 43 are installed in a housing of the torque control device 30 together with the signal process and control unit 31. There are further provided output terminals 44a and 44b for supplying the analog torque signal and the analog clamping force signal, respectively to the external.

Now the operation of the impact wrench of the present embodiment will be explained with reference to a flow chart shown in FIG. 7. When the valve operating lever 20 provided on the main body 10 of the impact wrench is pulled, the pulsatory rotational force is applied to the main spindle 15 and the clamping operation is initiated. At first, in a step S1, the clamping force F(o) is set to zero as an initial value, and then in a step S2, a peak value $T_p(i)$ of the pulsatory torque signal supplied from the torque signal processing circuit 32 is extracted by the peak processing circuit 33. Next, in a step S3, an increasing coefficient $C_{TF}(i)$ corresponding to the clamping force which has been calculated by that time is read out of the memory 34, and in a next step S4, the clamping force F(i) is calculated in the clamping force calculating circuit 35 in accordance with the following equation.

$$F(i) = F(i-1) + C_{TF}(i) \times T_p(i) \qquad (1)$$

wherein $C_{TF}(i) = C_{TF}[F(i-1)]$

In the first operation cycle, F(o)=0, so that a calculated clamping force F(1) in the step S4 becomes as follows:

$$F(1) = C_{TF}(0) \times T_p(1) \qquad (2)$$

Each time the clamping force F(i) has been calculated, in a step S5, the clamping force is compared with a predetermined threshold value cFc previously set in a valve control circuit 36. When the calculated clamping force does not exceed the threshold value, the operation is returned to the step S2. Then, a peak value $T_p(i)$ of a next pulsatory torque applied to the main spindle is extracted, a torque increasing coefficient $C_{TF}$ corresponding to the previously calculated clamping force F(i−1) is read out of the memory 34, and then a clamping force F(i) is calculated in accordance with the equation (1).

$$F_2 = C_{TF}(F_1) \times T_P.$$

When the calculated clamping force exceeds the threshold value cFc, it is judged that the bolt has been clamped with a desired clamping force. Then, in a step S6, the valve control circuit 36 supplies a valve shut-off command to the shut-off valve 12 to close the shut-off valve and the supply of the compressed air to the air motor unit 13 is cut-off. In this manner, the bolt clamping operation is completed.

During the above operation, the calculated clamping force F(i) is displayed on the clamping force display 43, and when the calculated clamping force F(i) exceeds the threshold value, a green lamp (OK) in the judged result display unit 43 is turned on and a red lamp (NG) provided in the judged result display unit 43 is turn off.

In the impact wrench of the present embodiment, the function representing the variation of the increasing coefficient with respect to the variation of the clamping force has been previously stored in the memory 34 and an increased amount of the clamping force is calculated in accordance with a peak value of a pulsatory torque applied to the main spindle and an increasing coefficient corresponding to the clamping force which has been calculated by that time, and the thus calculated increased amount is accumulated to derive the clamping force. Therefore, the clamping force can be accurately measured and the bolt can be clamped with a clamping force which is very close to the desired clamping force. As explained above, a plurality of the functions of the increasing coefficient are previously stored in the memory, and a desired one of the functions can be easily selected in accordance with impact wrenches to be used, bolts and substances to be clamped by bolts.

Moreover, in the present embodiment, there is provided the judged result display unit 43, so that the result of the automatic clamping operation can be easily confirmed by the light-on of the green lamp. Further, the variation of the clamping force can be always monitored by the clamping force display unit 42, and thus during the clamping operation an operator can precisely know a fact that the clamping force is increased toward a desired value.

Figure 8A:
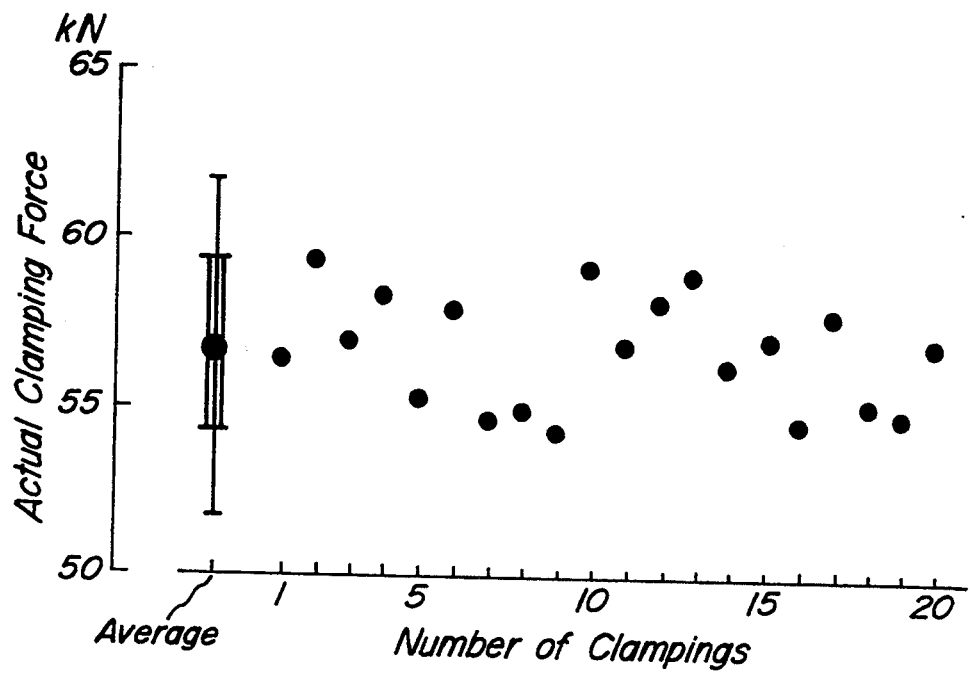
FIGS. 8A and 8B are graphs representing experimental results obtained by using the impact wrench shown in FIG. 2 and a known impact wrench.
Figure 8B:
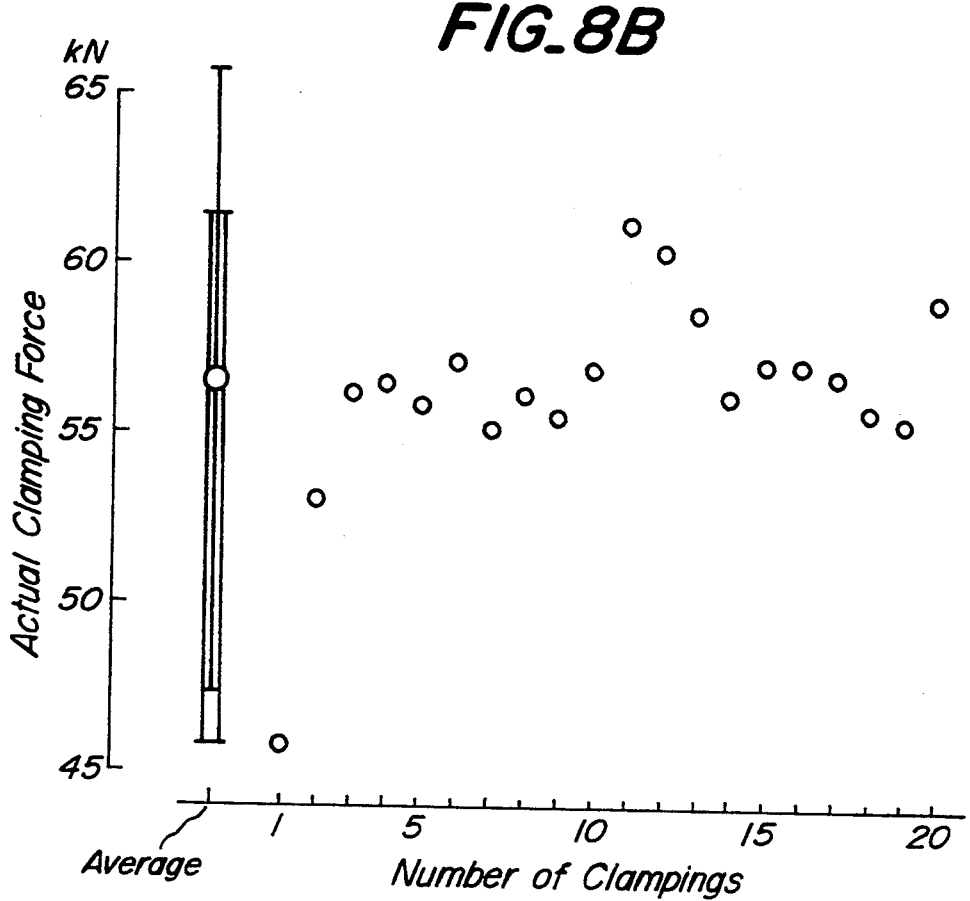

FIGS. 8A and 8b show experimental results, in which bolts having a diameter of 12 mm are clamped by using the above explained impact wrench according to the invention and a known impact wrench disclosed in U.S. Pat. No. 5,181,575, respectively. The clamping operation was carried out by twenty times by using respective impact wrenches. In the impact wrench according to the invention, the threshold value was set such that the shut-off valve is closed when the clamping force exceeds 56 kN, and in the known impact wrench, the shut-off valve is closed when the peak value of the pulsatory torque exceeds 85 kN. In FIGS. 8A and 8B, vertical axes denote the actually measured clamping force. Upon comparing the graphs shown in FIGS. 8A and 8B, it can be easily recognized that in the impact wrench according to the invention, a variation of the clamping force is smaller than that of the known impact wrench by more than two times, although average values of the clamping forces are substantially equal to each other.

In the above embodiment, when the calculated clamping force has exceeded the threshold value, the operation of the impact wrench is stopped and at the same time the final clamping force is displayed. However, according to the invention, the operation of the impact wrench may be stopped when the pulsatory torque exceeds a predetermined threshold value like as the known impact wrench and the varying clamping force and peak value of the pulsatory torque are displayed. Also in this case, the clamping force may be detected or monitored and the relationship between the pulsatory torque and the clamping force may be accurately measured.

In the above embodiment, the clamping apparatus according to the invention is formed as the impact wrench, but the clamping apparatus according to the invention may be constructed in various forms. For instance, the clamping apparatus may be formed as a nut runner or nut spinner of a multi-axis nut runner for clamping simultaneously a plurality of nuts onto a plurality of gusset bolts secured to a body of an automobile such that a suspension assembly is fastened to the body.

FIG. 9 shows another embodiment of the clamping apparatus according to the invention which is formed as the above mentioned nut runner. In FIG. 9, portions similar to those shown in FIG. 2 are denoted by the same reference numerals used in FIG. 2 and their explanation is dispensed with. The nut runner comprises a motor unit 71, a pulsatory torque generating unit 72 for generating a pulsatory torque in response to a rotation of an output shaft of the motor unit 71, a rotary shaft 73 driven by the pulsatory torque generated by the pulsatory torque generating unit 72, a socket 74 secured at a distal end of the rotary shaft 73, and a torque detecting unit 75 having the same construction as the torque detecting unit 11 shown in FIG. 2.

The torque detecting unit 75 is connected to the torque signal processing circuit 32 provided in the signal processing and controlling unit 31 of the torque control device 30, and the valve control circuit 36 is connected to the motor unit 71 so as to perform the same control as that of the embodiment illustrated in FIG. 2. By using the nut runner of the present embodiment, it is possible to clamp nuts to gusset bolts with the desired clamping force and therefore the bolt and nut clamping can be realized with a high quality.

Figure 11:
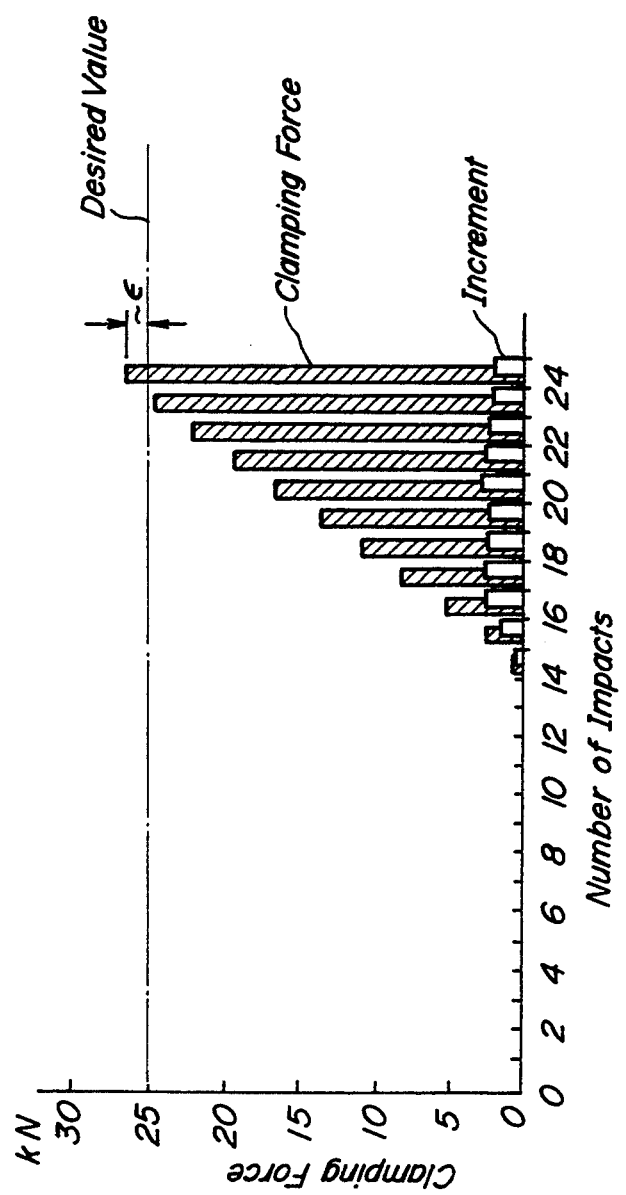
FIG. 11 is a graph representing variations of the clamping force and its increment for respective impacts.

In the above embodiments, the clamping force is calculated every time the peak of the pulsatory torque is detected, and when the calculated clamping force F exceeds the predetermined threshold value cFc, the valve control circuit generates the cut-off command and the shut-off valve is closed in response to this cut-off command. FIG. 10 is a graph showing a variation of the peak value of the pulsatory torque and FIG. 11 is a graph illustrating the variation of the clamping force. In FIG. 11, there is also shown increments of the clamping force for respective pulsatory torques, i.e. impacts. It should be noted that the peak value of the pulsatory torque is not constant and that the calculated clamping force F changes in a step-wise manner, so that the clamping force F could not be controlled much precisely than the increments of the clamping force. For instance, in FIG. 11, a desired clamping force is set to 25 kN and an average of the increments of the clamping force for respective impacts is about 3 kN, and therefore the clamping force could not be controlled at a precision which is smaller than the increment and there is produced an error $\epsilon$ which may amount to 12% of the desired value. According to another aspect of the invention, the above mentioned control error $\epsilon$ may be reduced and the final clamping force can be controlled in a very precise manner as will be explained hereinafter.

According to a second aspect of the invention, an impact type clamping apparatus comprises:

- a motor unit for generating a pulsatory driving torque;
- a switching means for switching on and off said motor unit;
- a main spindle driven by said pulsatory driving torque generated by said motor unit for rotating a fastening member;
- a torque detecting means for detecting a pulsatory torque applied to said main spindle to produce a torque signal;
- a calculating means for receiving said torque signal and calculating a clamping force in accordance with a peak value of a pulsatory torque applied to the main spindle and detected by said torque detecting means and a dependency of an increasing coefficient which represents an increasing rate of a clamping force applied to the fastening member by a unit amount of said peak value of the pulsatory torque upon said clamping force to derive a calculated clamping force; and
- a controlling means for deriving a difference between said calculated clamping force and a desired clamping force, and supplying a cut-off command to said switching means to make the operation of said motor unit off when it is judged that a calculated clamping force will exceed said desired value by a next pulsatory torque, said cut-off command being produced at a timing which is determined in accordance with said difference.

In the impact type clamping apparatus according to the second aspect of the invention, the increment of the clamping force is predicted or estimated and it is judged whether or not the clamping force will exceed the desired value by applying a next impact to the main spindle. When it is predicted that if a next impact is applied to the main spindle, the clamping force will exceed the desired value, this next impact is controlled such that the final clamping force arrives at the desired value. It should be noted that the increment of the clamping force can be controlled by changing a timing at which the motor unit is stopped. That is to say, when the motor unit is stopped at an earlier timing than that at which a relevant impact is completed, the increment becomes smaller than an increment which is obtained when the motor unit is operated until an end of the relevant impact. Therefore, according to the invention, the clamping force can be controlled very precisely and the final clamping force can be made closer to the desired value.

According a third aspect of the present invention, an impact type clamping apparatus comprises:

- a motor unit for generating a pulsatory driving torque;
- a switching means for switching on and off said motor unit;
- an adjusting means for adjusting a magnitude of said pulsatory driving torque generated by said motor unit;
- a main spindle driven by said pulsatory driving torque generated by said motor unit for rotating a fastening member;
- a torque detecting means for detecting a pulsatory torque applied to said main spindle to produce a torque signal;
- a calculating means for receiving said torque signal and calculating a clamping force in accordance with a peak value of a pulsatory torque applied to the main spindle and detected by said torque detecting means and a dependency of an increasing coefficient which represents an increasing rate of a clamping force applied to the fastening member by a unit amount of said peak value of the pulsatory torque upon said clamping force to derive a calculated clamping force; and
- a controlling means for deriving a difference between said calculated clamping force and a desired clamping force, supplying a first command to said adjusting means such that the pulsatory torque generated by said motor unit is reduced, when it is judged that said difference becomes smaller than a predetermined value, and supplying a second command to said switching means to make the operation of said motor unit off when a calculated clamping force exceeds said desired value.

In this impact type clamping apparatus according to the third aspect of the invention, after the difference between the calculated clamping force and the desired clamping force has become smaller than the predetermined value, the adjusting means is operated to reduce the output level of the motor unit, so that an increment of the clamping force due to respective one of successive impacts is reduced. Therefore, even if the switching means is controlled by a cut-off command which is produced when the calculated clamping force exceeds the threshold value, the final clamping force can be controlled very precisely.

According to a fourth aspect of the invention, an impact type clamping apparatus comprises:

- a motor unit for generating a pulsatory driving torque;
- a switching means for switching on and off said motor unit;
- a main spindle driven by said pulsatory driving torque generated by said motor unit for rotating a fastening member;
- a torque detecting means for detecting a pulsatory torque applied to said main spindle to produce a torque signal;
- a rotation detecting means for detecting a rotation of said main spindle to produce a rotation signal;
- a judging means for processing said rotation signal to generate a calculation start signal when it is judged that a rotation of the main spindle due to an impact has become smaller than a predetermined threshold value:
- a calculating means for starting a calculation in response to said calculation start signal and calculating a clamping force in accordance with a peak value of a pulsatory torque applied to the main spindle and detected by said torque detecting means and a dependency of an increasing coefficient which represents an increasing rate of a clamping force applied to the fastening member per a unit amount of said peak value of the pulsatory torque upon said clamping force to generate a calculated clamping force; and a controlling means for deriving a difference between said calculated clamping force and a desired clamping force and supplying a cut-off command to said switching means to make the operation of said motor unit off when a calculated clamping force exceeds said desired clamping force.

According to a fifth aspect of the invention, an impact type clamping apparatus comprises:

a motor unit for generating a pulsatory driving torque;

a switching means for switching on and off said motor unit;

a main spindle driven by said pulsatory driving torque generated by said motor unit for rotating a fastening member;

a torque detecting means for detecting a pulsatory torque applied to said main spindle to produce a torque signal;

a calculating means for calculating a clamping force in accordance with a peak value of a pulsatory torque applied to the main spindle and detected by said torque detecting means and a dependency of an increasing coefficient which represents an increasing rate of a clamping force applied to the fastening member per a unit amount of said peak value of the pulsatory torque upon said clamping force to generate a calculated clamping force; and a controlling means for performing a first judgment for judging whether or not said calculated clamping force exceeds a desired clamping force, performing a second judgment for judging whether a peak value of a pulsatory torque due to a relevant impact is out of a predetermined range, when it is judged that the calculated clamping force has exceeded the desired clamping force, deriving a correction coefficient corresponding to a deviation of the peak value of the pulsatory torque from a center value of said predetermined range when it is judged that the peak value of the pulsatory torque is out of said predetermined range, correcting said calculated clamping force by multiplying said calculated clamping force by said correction coefficient to derive a corrected clamping force, and supplying a cut-off command to said switching means to make the operation of said motor unit off when said corrected clamping force exceeds said desired clamping force.

In a preferable embodiment of the impact type clamping apparatus according to the above mentioned fifth aspect of the present invention, said increasing coefficient is also corrected in accordance with said correction coefficient.

Figure 12:
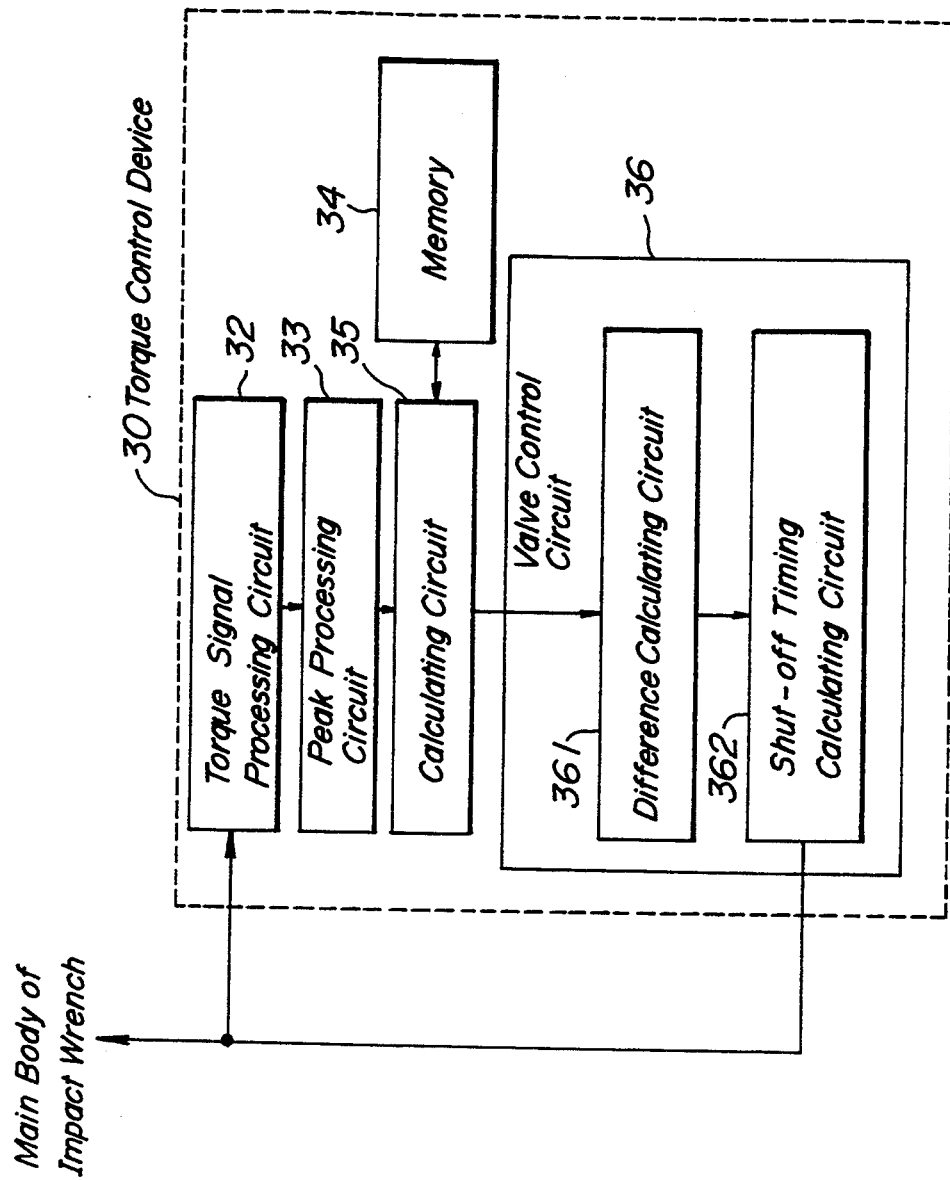
FIG. 12 is a block diagram showing a construction of the torque control device of another embodiment of the impact wrench according to the invention.

FIG. 12 a block diagram showing an embodiment of the impact type clamping apparatus according to the above mentioned second aspect of the invention. In FIG. 12 there is shown only the torque control device and the main body of the impact wrench is not shown. It should be noted that the construction of the main body of the impact wrench is entirely same as that shown in FIG. 2, and that portions similar to those illustrated in FIG. 2 are denoted by the same reference numerals used in FIG. 2. The torque control device 30 comprises torque signal processing circuit 32 for generating a torque signal from the output of the torque detecting unit, peak processing circuit 33 for extracting a peak value of the pulsatory torque by processing the torque signal, memory 34 for storing the functions which represent relationship between the increasing coefficients and the clamping force, and valve control circuit 36 including a difference calculating circuit 361 for deriving a difference between the calculated clamping force and the desired clamping force and a shut-off timing calculating circuit 362 for determining a timing at which the valve shut-off command is generated.

Now the operation of the impact wrench of the present embodiment will be explained with reference to a flow chart illustrated in FIG. 13. When the valve operating lever 20 is pulled, the compressed air is supplied from the air supply unit 16 to the air motor unit 13 via the shut-off valve 12 and the output shaft 22 of the air motor unit is rotated (see FIG. 2). This rotation is converted into the pulsatory torque by means of the oil pressure pulse generating unit 14 and this pulsatory torque is transmitted to the main spindle 15 and the fastening member is clamped.

In a step S11 shown in FIG. 13, a desired clamping force cFc, i.e. a cut-off clamping force is set. Next in a step S12, an initial clamping force F(0) is set to zero. Steps S14 to S19 form a loop and calculations are carried out each time an impact is applied. In a step S14, a peak value $T_p(i)$ is extracted from a plurality of samples obtained by the torque signal processing circuit 32 and the thus extracted peak value is stored. In a next step S15, from the memory 34, an increasing coefficient $C_{TF}(i)$ is read out of a map stored in the memory 34 in accordance with an accumulated clamping force $F(i-1)$ up to now. That is to say, $C_{TF}(i) = C_{TF}[F(i-1)]$.

Next in a step S16, an increment of the clamping force $\delta F(i)$ due to the relevant impact is calculated in the following manner.

$$\delta F(i) = C_{TF}[F(i-1)] \times T_p(i) \qquad (3)$$

Then, in a step S17, a clamping force F(i) which is attained by the relevant impact is calculated as follows.

$$F(i) = F(i-1) + \delta F(i) \qquad (4)$$

In a next step S18, a difference between the desired clamping force cFc and the thus calculated clamping force F(i) is derived as a shortage of clamping force $$F_N(i) = cFc - F(i) \qquad (5)$$

Then, in a step S19, it is judged whether or not the shortage of clamping force $F_N(i)$ could be removed by a next impact. In this case, it is assumed that the next impact will produce the same increment $\delta F(i)$ as that of the relevant impact. That is to say, the judgment is carried out in the following manner.

$$F_N(i) \leq \delta F(i) \qquad (6)$$

However, in practice, an actual increment produced by a next impact will be about 0.7 to 0.9 of the relevant increment $\delta F(i)$, so that the judgment may be performed as follows.

$$F_N(i) \leq 0.8 \times \delta F(i) \qquad (6')$$

In the step S19, when it is judged that the desired clamping force could not be attained by the next impact, that is to say when it is judged that $F_N(i) \leq \delta F(i)$ or $F_N(i) \leq 0.8 \times \delta F(i)$ is not satisfied, the operation is returned to the step S14 and the next impact is fully applied. Contrary to this, when it is judged that the desired clamping force will be attained by the next impact, a timing at which the supply of the compressed air to the air motor 13 is cut-off is determined by steps by a step S20.

FIG. 14 is a graph showing a relationship between an amount of the increment in the clamping force by an impact and the air supply cut-off timing. In FIG. 14, a horizontal axis denotes a time period $T_d$ in millisecond from an instance at which the application of the impact is started to an instance at which the supply of the compressed air is cut-off, and a vertical axis represents an increment in the clamping force $\delta F(i)$ in Newton. As can be seen in FIG. 14, an increment of the clamping force due to a single impact can be controlled by adjusting the cut-off timing of the air supply to the air motor unit.

FIG. 15 is a graph showing an actual control of the cut-off timing of the compressed air supply to the air motor unit. In FIG. 15, a vertical axis denotes a cut-off timing, i.e. a time period $T_d$ from an initiation of the impact to a cut-off of the compressed air supply, and a horizontal axis shows the shortage of clamping force $F_N(i)$. The time period $T_d$ may be represented by a straight line which crosses the vertical axis at a point of a sum $T_0$ of a delay time (e.g. 5 ms) which is required to carry out the steps S14 to S20 and a delay time (about 10 ms) from a time instance at which the shut-off command is supplied to the shut-off valve 12 to a time instance at which the supply of the compressed air is actually cut-off, said straight line having an inclination of $T_C$. When the shortage of clamping force $F_N(i)$ is calculated, the cut-off timing $T_d$ can be derived from the straight line by effecting the following equation in a step S20.

$$T_d = T_C \times F_N(i) + T_0 \quad (7)$$

In a next step S21, elapsing time t is compared with the thus calculated cut-off timing $T_d$ ($t > T_d$), and when the time t has passed over $T_d$, the valve control circuit 36 generates the cut-off command in a step S22. The thus generated cut-off command is supplied to the shut-off valve 12 to complete the clamping operation. In a next step S23, it is checked whether the clamping operation is finished or not. If the clamping operation is continued, return to the step S12.

As explained above, in the present embodiment, a difference between the desired clamping force and a clamping force which will be attained by a relevant impact is derived and when it is predicted that the clamping force will exceed the desired clamping force, the cut-off timing is calculated in accordance with the shortage of the clamping force. In this manner, the clamping operation can be performed precisely with the clamping force which is very close to the desired clamping force.

Figure 18:
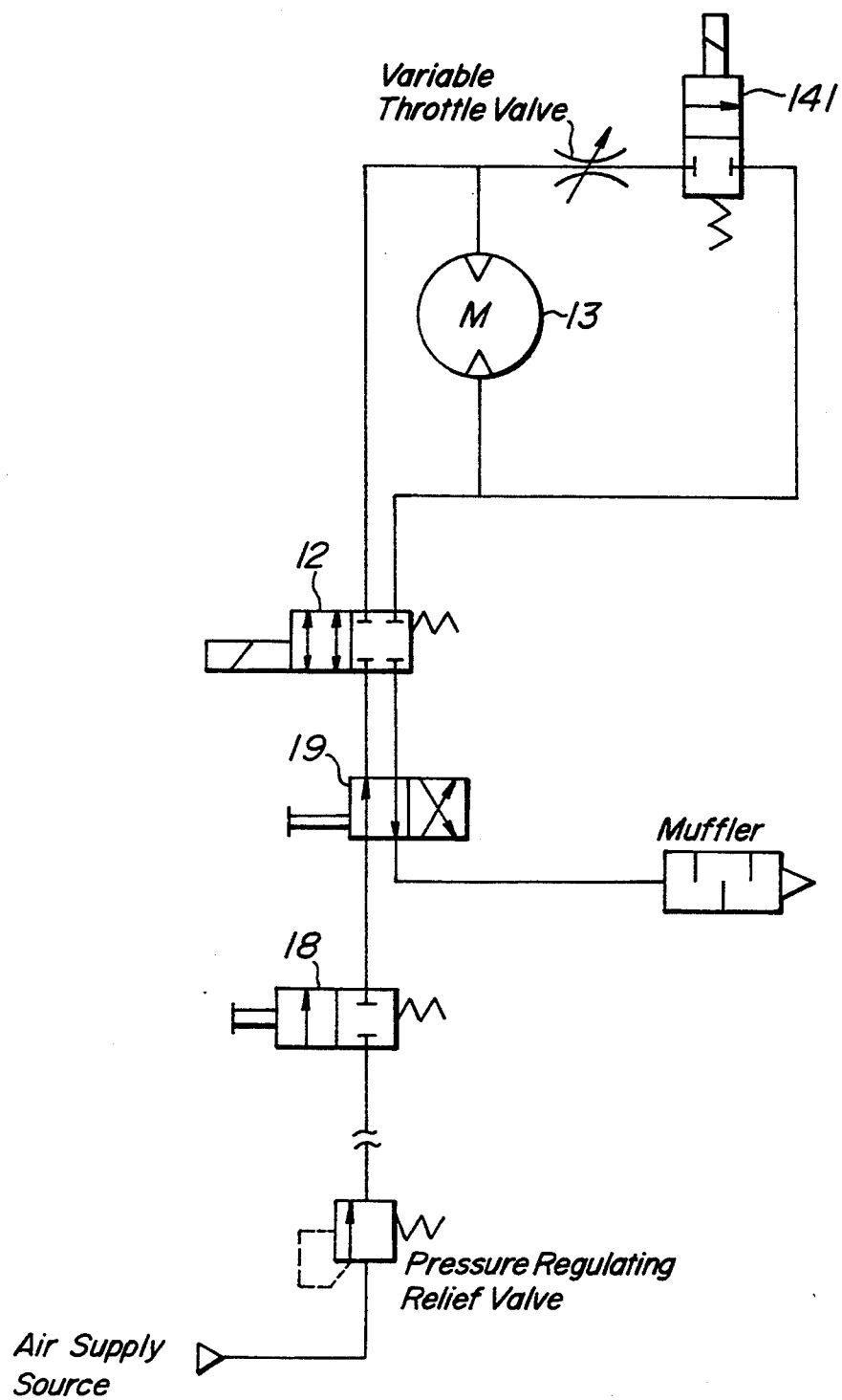
FIG. 18 is a fluid circuit of the impact wrench of FIG. 16.
Figure 19:
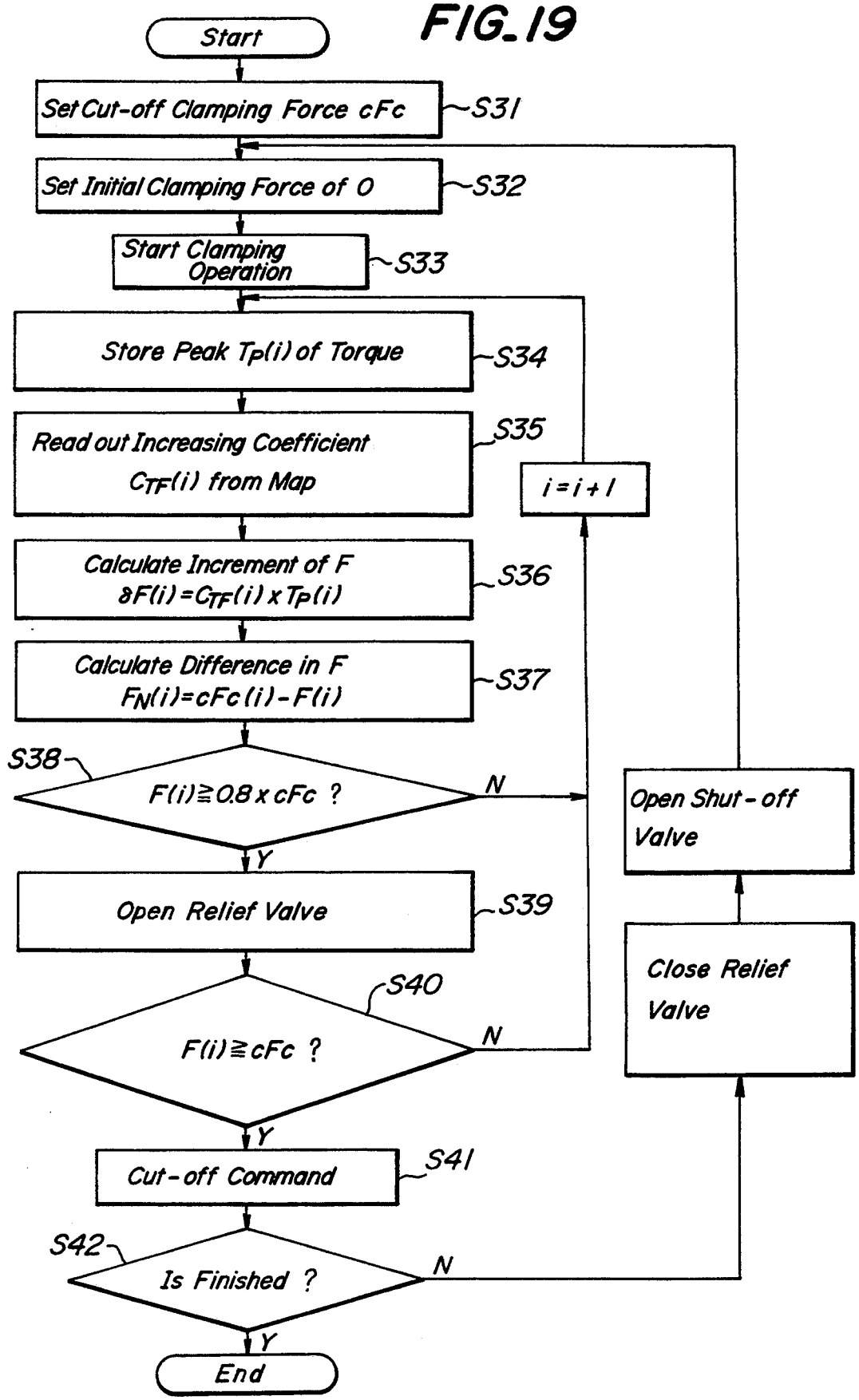
FIG. 19 is a flow chart representing the operation of the impact wrench shown in FIG. 16.

FIGS. 16 to 19 show an embodiment of the impact wrench according to the third aspect of the invention. FIG. 16 is a cross sectional view illustrating the main body of the impact wrench of the present embodiment, FIG. 17 is a block diagram of the valve control device, FIG. 18 is a schematic view showing the fluid circuit and FIG. 19 is a flow chart representing the operation of the impact wrench of the present embodiment. The basic construction of the main body 10 of the impact wrench of the present embodiment is substantially same as that of the first embodiment shown in FIG. 2 and only differs from the first embodiment in a point that a pressure relief valve 141 is provided. The pressure relief valve 141 serves to reduce the pressure of the compressed air supplied to the air motor unit 13 by a predetermined amount.

As shown in FIG. 17, the torque control device 30 comprises torque signal processing circuit 32, peak processing circuit 33, memory 34 and calculating circuit 35 which are identical with those shown in FIG. 2, but the construction of the valve control circuit 36 is different. That is to say, the valve control circuit 36 comprises a first detecting circuit 36-1 for detecting that the clamping force is closer to the desired value and a second detecting circuit 36-2 for detecting that the clamping force exceeds the desired value.

Now the operation of the impact wrench of the present embodiment will be explained with reference to the flow chart illustrated in FIG. 19. In FIG. 19, steps S31 to S37 are identical with the steps S11 to S17 shown in FIG. 13. In a next step S38, it is judged whether the clamping force F(i) is close to the desired clamping force cFc. In the present embodiment, this is carried out by comparing the clamping force F(i) with $0.8 \times cFc$. If the maximum clamping force attained by the impact wrench is rather great as compared with the desired clamping force, the clamping force F(i) may be compared with $0.6 \times cFc$.

If the clamping force F(i) is judged to be smaller than $0.8 \times cFc$, return to the step S34 and a next impact is applied. But when the clamping force is equal to or greater than $0.8 \times cFc$, in a next step S39, the first detecting circuit 36-1 generates a relief valve open command and the relief valve 142 is opened. When the relieve valve 141 is opened, the pressure of the compressed air applied to the air motor unit 13 is reduced from for instance 0.7 MPa to 0.4 MPa. The air pressure determines an acceleration of the rotation of the air motor unit 13, so that a peak value of the torque is reduced and therefore an increment of the clamping force by an impact is also decreased.

Figure 20:
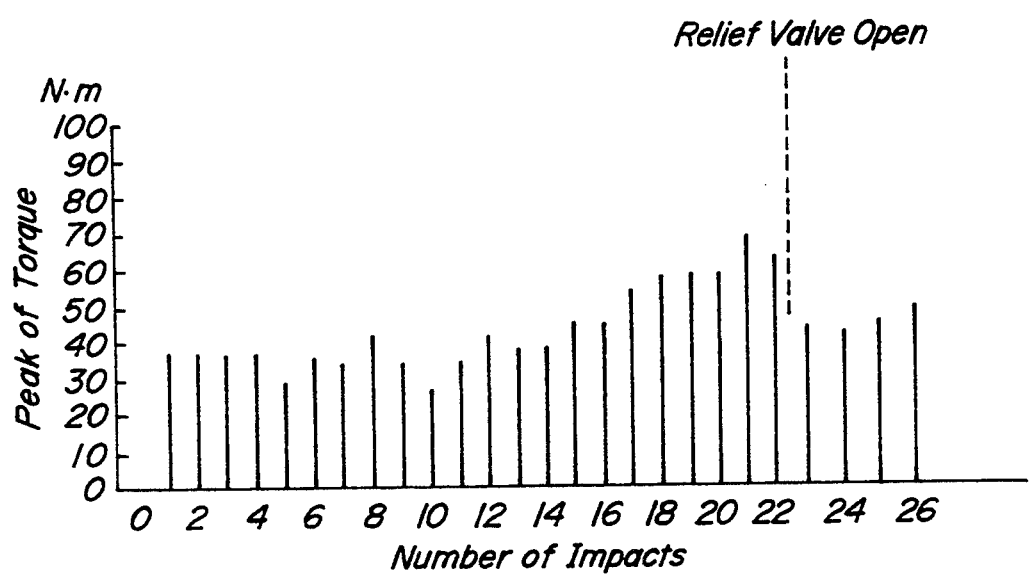
FIG. 20 is a graph showing a variation in the peak value of the pulsatory torque of the impact wrench shown in FIG. 16.
Figure 21:
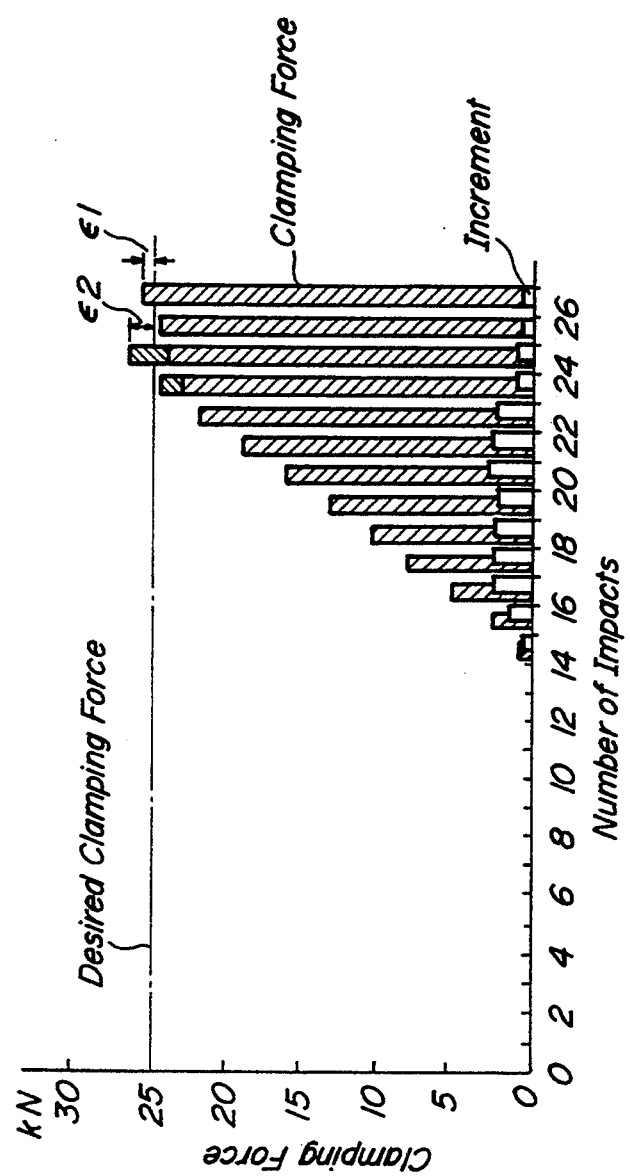
FIG. 21 is a graph denoting a variation in the clamping force of the impact wrench of FIG. 16.

FIG. 20 shows a variation of the peak value of the pulsatory torque and FIG. 21 illustrates a variation of the clamping force. When the clamping force becomes closer to the desired clamping force and the relief valve 141 is opened, increments in the clamping force by respective impacts are reduced, so that the clamping force is increased gradually.

In a next step S40, it is judged whether the clamping force exceeds the desired value, and if the clamping force exceeds the desired value, there is produced the cut-off command. That is to say, the second detecting circuit 36-2 supplies the cut-off command to the shut-off valve 12 and the supply of the compressed air supply to the air motor 13 is shut-off. In this manner, the clamping operation is completed. If it is required to continue the clamping operation, the relief valve 141 is closed and the shut-off valve 12 is opened.

In the present embodiment, when the clamping force has become closer to the desired clamping force, the pressure of the compressed air supplied to the air motor unit is reduced, so that an output level of the air motor unit is decreased and an increment in the clamping force due to an impact is also decreased. As shown in FIG. 21, an error $\epsilon_1$ between the actual clamping force and the calculated clamping force is smaller than an error $\epsilon_2$ of the known impact wrench. Therefore, the clamping force can be controlled precisely and the final clamping force which is very close to the desired clamping force can be attained.

Figure 22:
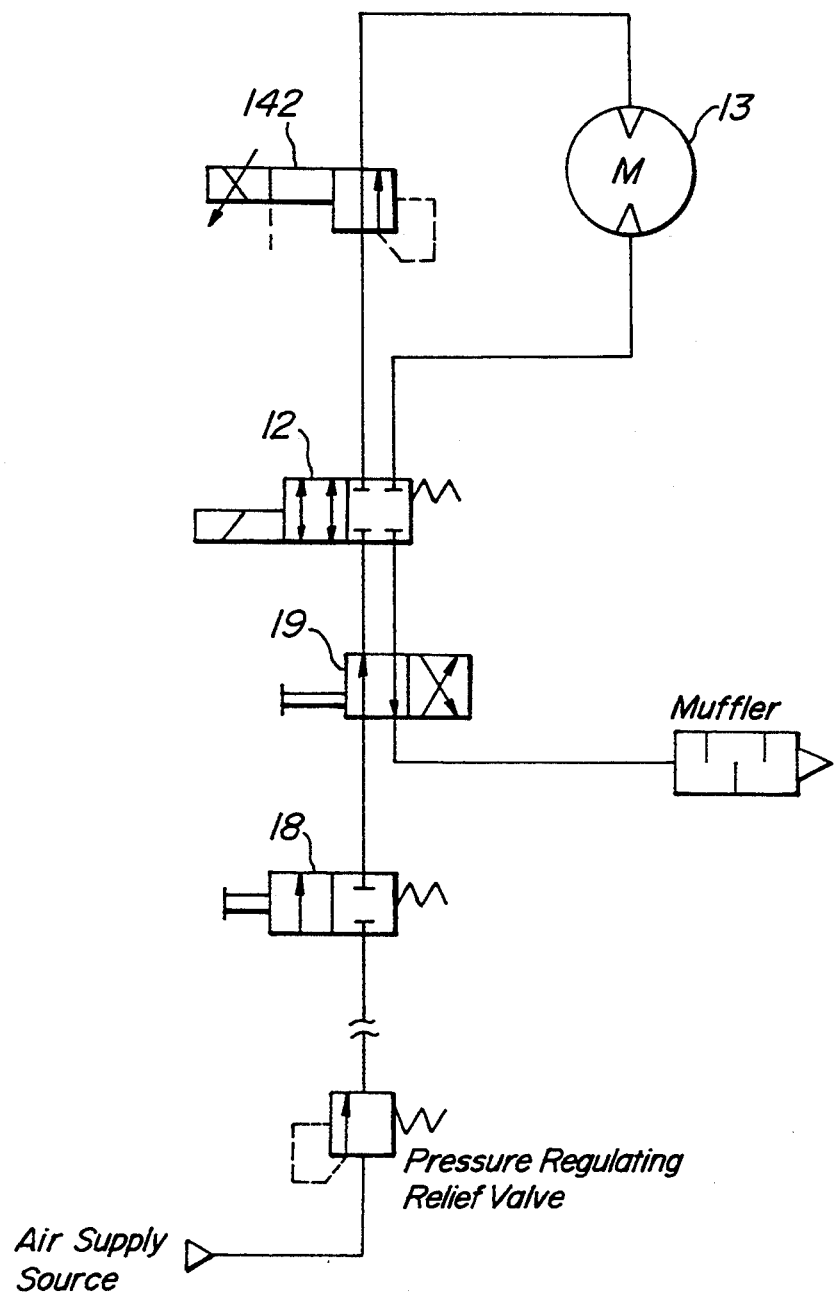
FIG. 22 is a fluid circuit of a modification of the embodiment shown in FIG. 16.
Figure 23:
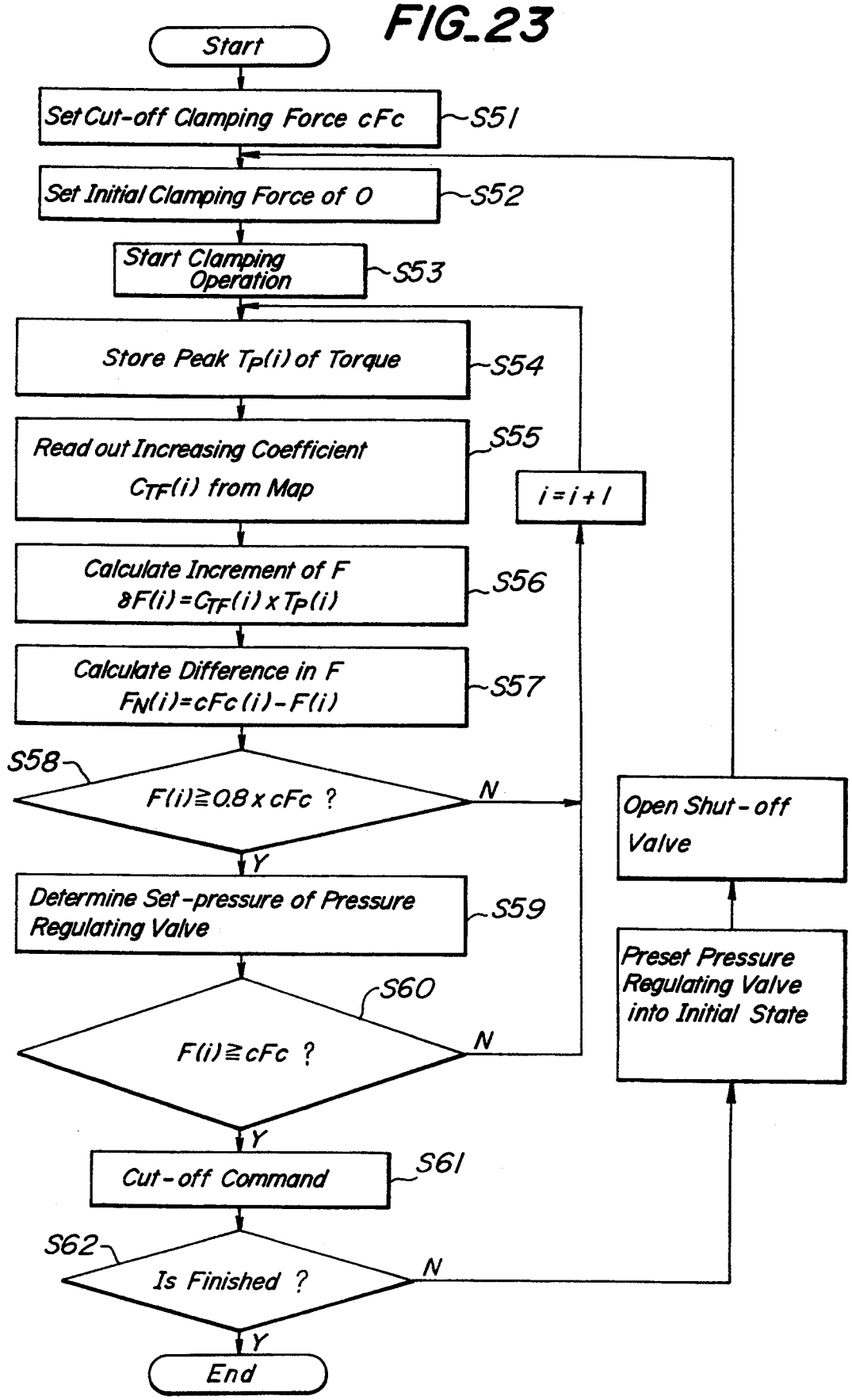
FIG. 23 is a flow chart showing the operation of the modification illustrated in FIG. 22.

FIGS. 22 and 23 show a modification of the embodiment illustrated in FIGS. 16 to 19. In the present embodiment differs from the previous embodiment only in a point that the relief valve 141 is replaced by a pressure regulating vale 142, and a step S59 in the flow chart shown in FIG. 23 differs from the step S39 in FIG. 19. The pressure regulating valve 142 may be formed by a proportional electromagnetic relief valve. When it is judged that the clamping force F(i) has become closer to the desired clamping force cFc in the step S58, a set-pressure of the pressure regulating valve 142 is determined. This set-pressure is gradually reduced in accordance with the increase in the clamping force F(i). In the present embodiment, the set-pressure $P_{ACT}$ is determined in accordance with the following equation.

$$P_{ACT} = P_{ORG}[2 - 1.5 \times F(i)/cFc] \qquad (8)$$

where $P_{ORG}$ is the pressure of the compressed air.

When the pressure of the compressed air supplied to the air motor unit 13 of the impact wrench is reduced in the manner explained above, an acceleration of the air motor is decreased and thus a next impact energy is reduced and an increment of the clamping force by an impact is also reduced.

In FIG. 23, when the clamping operation is continued, the pressure regulating valve 142 is preset into the initial state, and then the shut-off valve 12 is opened.

It should be noted that the embodiments shown in FIGS. 12 to 23 may be applied to the nut runner like as the embodiment illustrated in FIG. 9.

Figure 24:
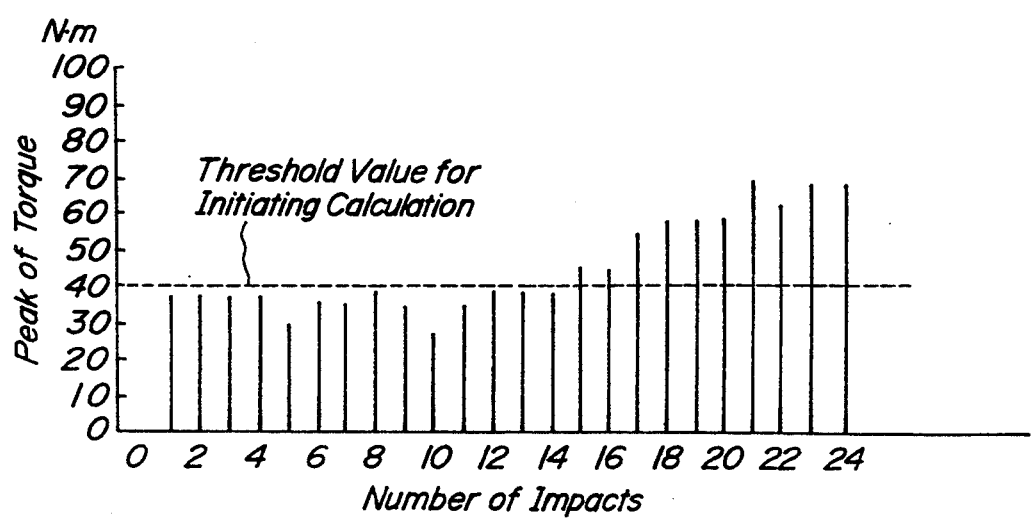
FIG. 24 is a graph representing a variation in the peak value of the pulsatory torque.
Figure 25:
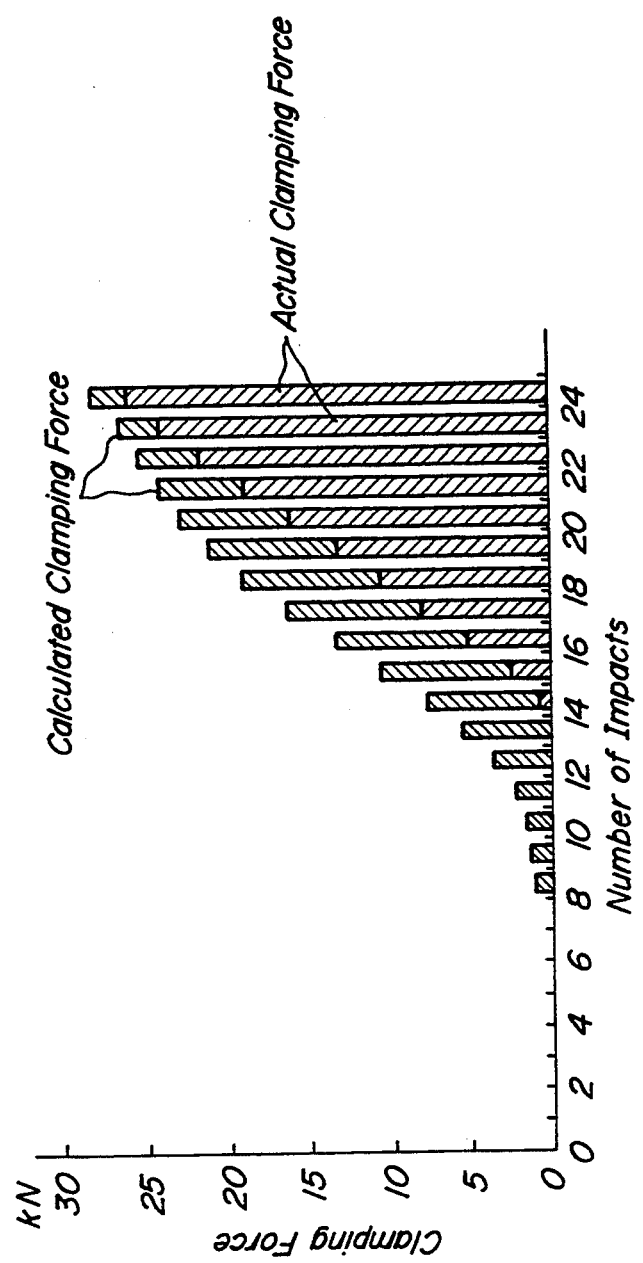
FIG. 25 is a graph denoting a variation in the clamping force.

In the first embodiment of the impact wrench according to the invention shown in FIG. 2, it has been found that an error might be introduced between the actual clamping force and the calculated clamping force under certain conditions. FIG. 24 is a graph showing a variation of the peak value of the pulsatory torque for respective impacts. In the embodiment shown in FIG. 2, the clamping force is calculated from a start of the clamping operation, so that the clamping force is increased at an earlier timing than a timing at which bolts or nuts are actually clamped. Therefore, the calculated clamping force is liable to be larger than the actual clamping force as depicted in FIG. 25. This is due to the fact that before a bolt or nut is set or settled at a given position, a torque is more or less required for rotating the bolt or nut. Particularly, when a shape of a abutting surface of the bolt or nut is different from a desired one or a precision of a screw thread fluctuates, a relatively large torque is required prior to the actual clamping operation. In the above embodiment, before the actual clamping operation is initiated, when there is produced a clamping torque, the accumulation of the clamping force is started, and thus the final calculated clamping force is somewhat larger than the actual clamping force with which the bolt or nut is actually clamped. Although this error is not so large, it could not be negligible for some applications. Further, when contact surfaces of the fastening members and substances to be clamped have a coefficient of friction which is larger than a usual value, the calculated clamping force becomes larger than the actual clamping force and the final clamping force does not reach the desired clamping force.

The above mentioned drawbacks can be removed by embodiments of the clamping apparatus according to the fourth and fifth aspects of the invention. According to the fourth aspect of the invention, there is provided a detecting means for detecting the rotation of the main spindle due to a single impact, and when the rotation angle is detected to be smaller than a predetermined value, the calculation of the clamping force is initiated. It has been experimentally confirmed that when the fastening member such as bolt and nut is rotated, at first the fastening member is rotated over a large rotation angle by a single impact, but when the fastening member is set firmly, the rotation angle of the fastening member due to the impact becomes smaller. Therefore, by detecting the rotation angle of the main spindle by a single impact, it is possible to judge whether the fastening member is set or not. According to the fourth aspect of the present invention, after confirming the fact that the fastening member has been firmly set, the calculation of the clamping force is initiated, so that the final clamping force can be measured accurately without being affected by the difference in the shape of the fastening members and the precision of screw threads.

Further, according to the fifth aspect of the invention, when the calculated clamping force exceeds the desired clamping force, it is judged whether or not the peak value of the relevant pulsatory torque is out of a predetermined normal range, when the peak value is judged to be out of the normal range, the clamping force is corrected by deriving a product of the clamping force and a correction coefficient corresponding to a deviation of the peak value from a center value of the normal range to derive a corrected clamping force, and when the corrected clamping force exceeds the predetermined clamping value, the clamping operation is finished.

When the contact surfaces of the fastening member and the substances to be clamped have a large coefficient of friction, the pulsatory torque could not be fully utilized to clamp the fastening member, so that the calculated clamping force is liable to be larger than the actual clamping force. This can be judged by detecting the deviation of the peak value of the pulsatory torque with respect to the normal range and the calculated clamping force is corrected in accordance with a deviation of the peak value of the pulsatory torque with respect to the center value of the normal range. In this manner, the clamping force can be calculated accurately without being affected by the large coefficient of friction between the bolt and the nut as well as the large friction between the fastening member and the substance to be clamped.

Figure 26:
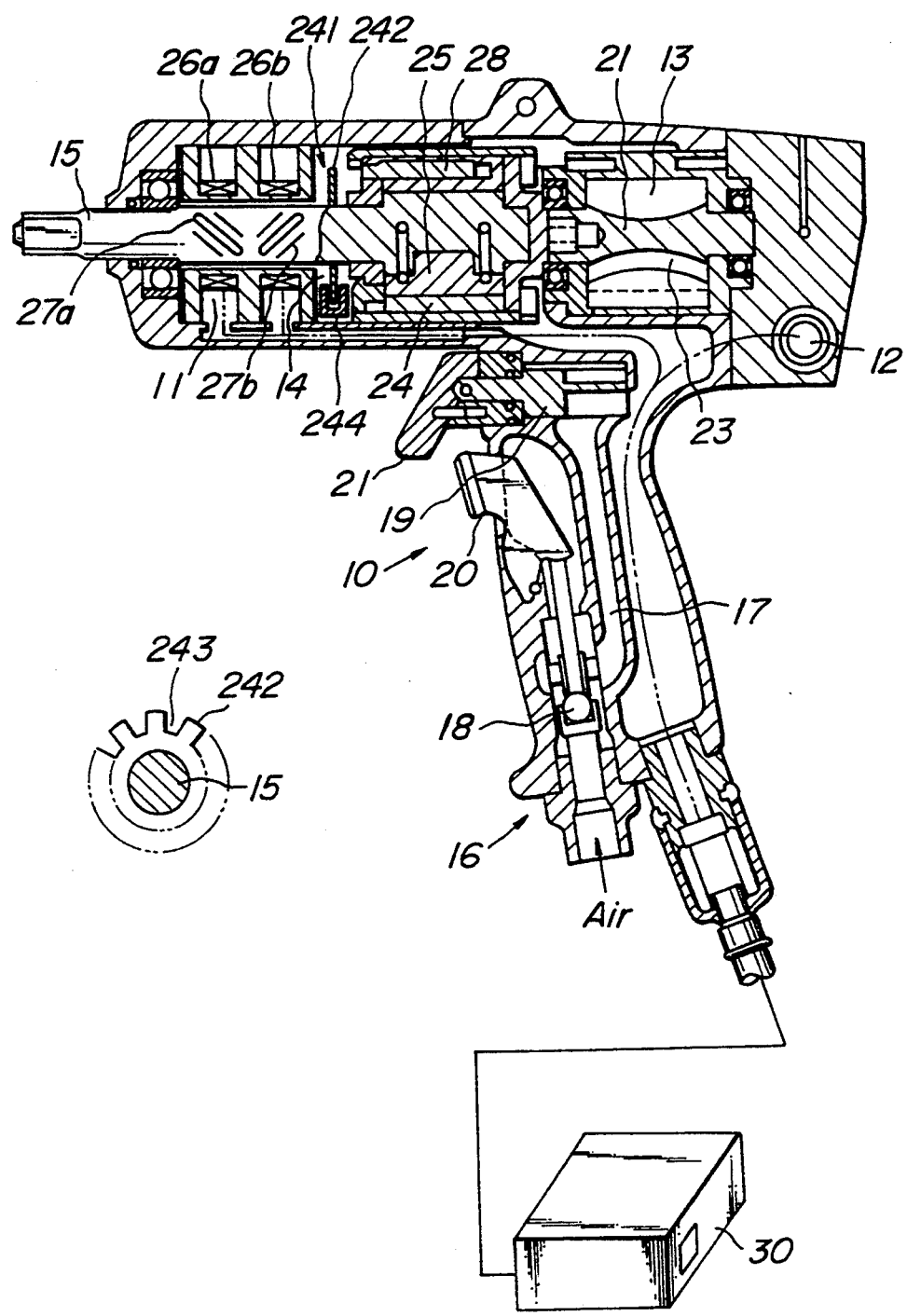
FIG. 26 is a cross sectional view illustrating the main body of another embodiment of the impact wrench according to the invention.
Figure 27:
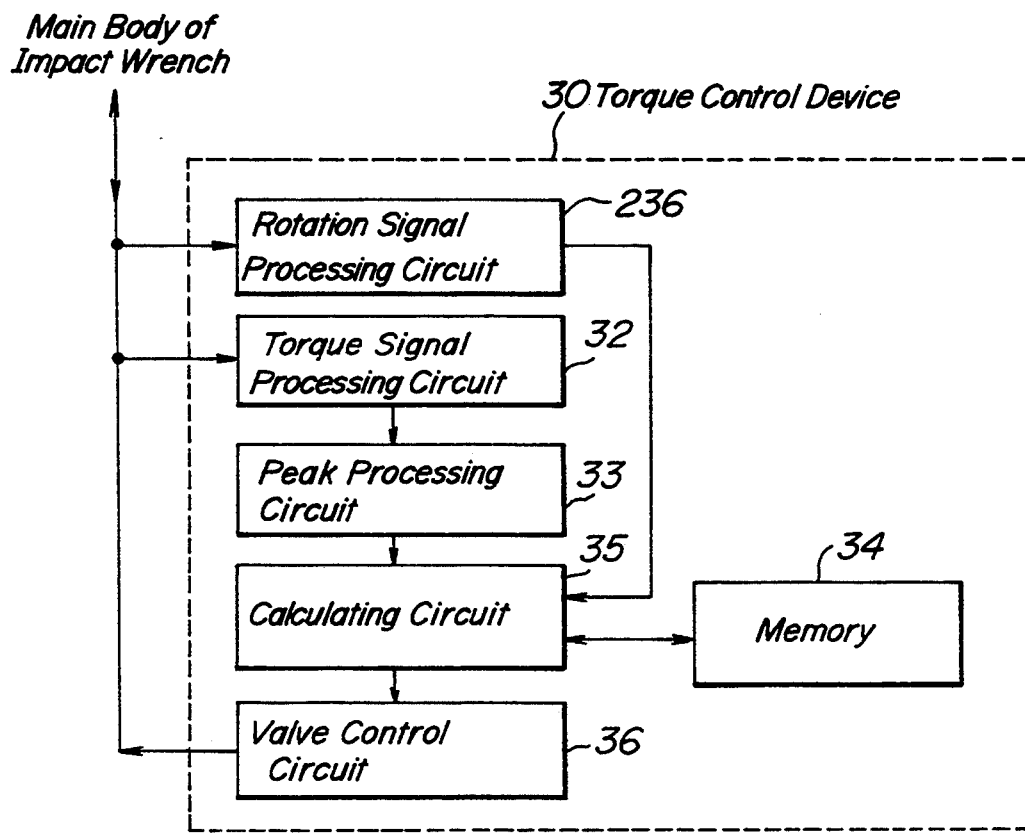
FIG. 27 is a block diagram showing a construction of the torque control device of the impact wrench shown in FIG. 26.
Figure 29:
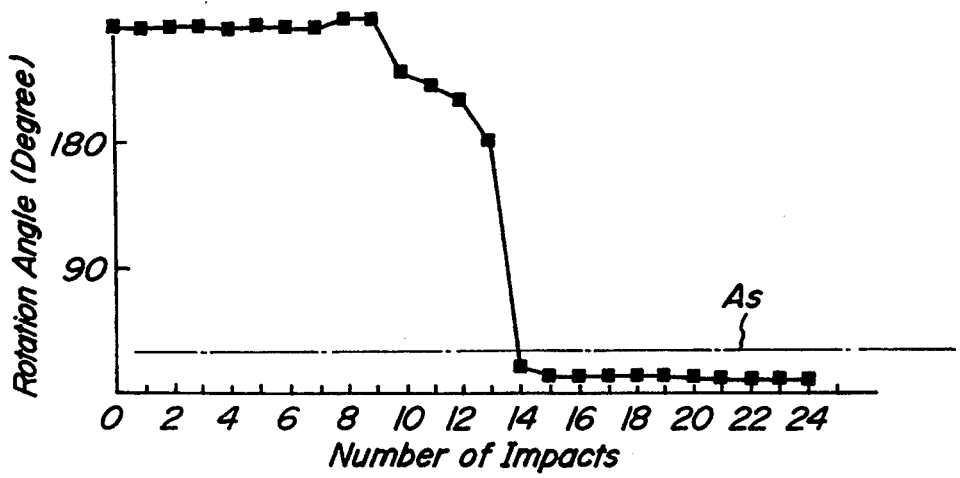
FIG. 29 is a graph showing a variation in a rotation angle of the main spindle by respective impacts.
Figure 30:
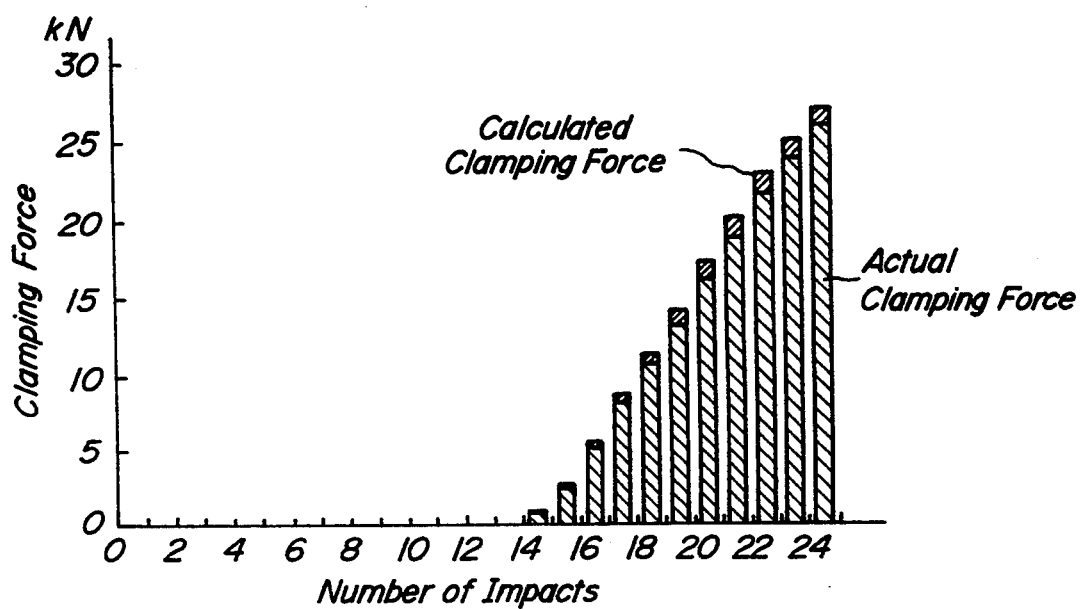
FIG. 30 is a graph denoting variations in the calculated clamping force and actual clamping force.

FIGS. 26 and 27 illustrates an embodiment of the impact wrench according to the fourth aspect of the invention, in which the calculation of the clamping force is initiated after the rotation angle of the main spindle has become smaller than a predetermined value. As shown in FIG. 29, before the fastening member is set firmly, the rotation angle of the main spindle due to a single impact is large, but after the fastening member has been set firmly, the rotation angle of the main spindle due to a single impact becomes very small. According to the present embodiment, the calculation of the clamping force is not initiated as long as the rotation angle of the main spindle due to a single impact becomes equal to or smaller than a predetermined threshold value As. That is to say, the calculation of the clamping force is initiated after the rotation angle of the main spindle due to a single impact has decreased below the threshold value As. Then, the clamping force can be calculated very accurately.

FIG. 26 is a cross sectional view showing the main body of the impact wrench of the present embodiment. In FIG. 26, portions similar to those shown in FIG. 2 are denoted by the same reference numerals used in FIG. 2. In the present embodiment, there is provided a rotation detecting unit 241 including a disc 242 secured to the main spindle 15 and a sensor 244 for detecting slits 243 formed in the disc 242. The sensor 244 may be formed by a photointerruptor or magnetic sensor. When the main spindle 15 is rotated, the disc 242 is also rotated together with the main spindle and the slits 243 pass through the sensor 244. In this manner, the rotation of the main spindle 15 can be detected and the sensor 244 generates a rotation signal.

FIG. 27 is a block diagram depicting the construction of the torque control device 30 of the present embodiment. The torque control device 30 comprises, in addition to the torque signal processing circuit 32, peak processing circuit 33, memory 34, calculating circuit 35 and valve control circuit 36, a rotation signal processing circuit 236.

Figure 28:
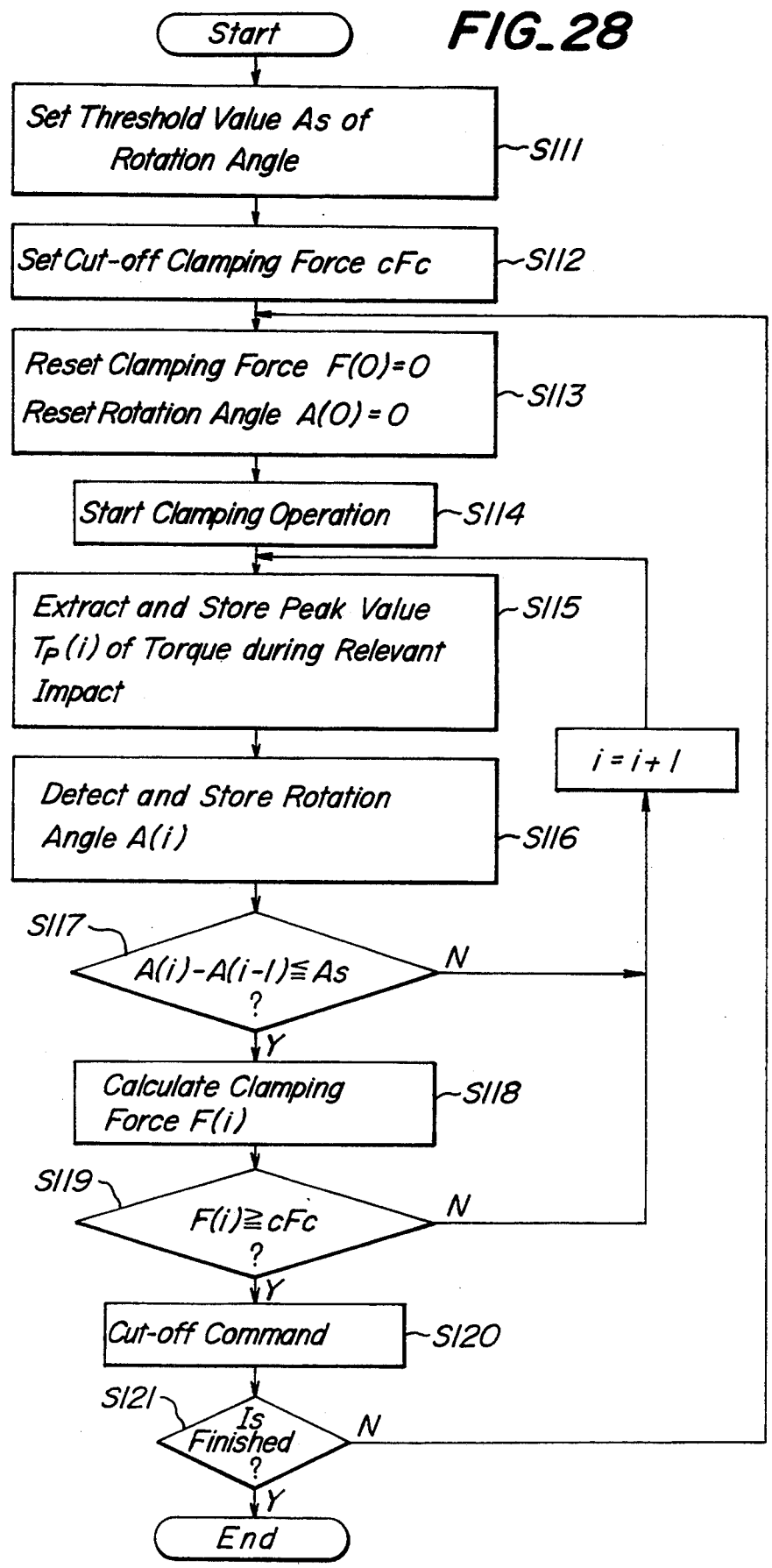
FIG. 28 is a flow chart representing the operation of the impact wrench of FIG. 26.

Now the operation of the impact wrench of the present embodiment will be explained with reference to a flow chart shown in FIG. 28. In a first step S111, a threshold value As of the rotation angle is set. As will be apparent hereinafter, in the present embodiment, an increment of the rotation angle is detected and then the thus detected increment is compared with the threshold value As. In a next step S112, a desired clamping force cFc is set as a cut-off clamping force. Then, in a step S113, an initialization is performed by setting the initial clamping force $F(O)=0$ and initial rotation angle $A(O)=0$. After that, the clamping operation is initiated in a step S114. Steps 115 to S119 form a loop and every time an impact is applied, the steps are proceeded along the loop.

In the step S115, a peak value $T_p(i)$ is extracted in the peak processing circuit 33 from a plurality of samples obtained by the torque signal processing circuit 32 and the thus extracted peak value is stored. Next, in a step S116, an output signal of the rotation signal processing circuit 236 is processed to derive a rotation angle $A(i)$ for a relevant impact. The thus derived rotation angle is also stored. In a next step S117, a difference between the relevant rotation angle $A(i)$ and a previous rotation angle $A(i-1)$ is derived and it is judged whether or not the thus derived difference is equal to or smaller than the threshold value As. When the difference is larger than the threshold value As, return to the step S115 and an application of a next impact is performed. When the difference between the rotation angles $A(i)$ and $A(i-1)$ is equal to or smaller that the threshold value As, in a step S118 the clamping force $F(i)$ is calculated. This calculation is entirely same as that of the first embodiment and is performed in accordance with the equations (3) and (4). That is to say, an increment of the clamping force $\delta F(i) = C_{TF}[F(i-1)] \times T_p(i)$ $T_P$ is calculated and then the clamping force $F(i)$ which is attained by the relevant impact is calculated by $F(i) = F(i-1) + \delta F(i)$.

It should be noted that once the difference between the rotation angles $A(i)-A(i-1)$ has been judged to be equal to or smaller than the threshold value As, the judgment in the step S117 is dispensed with until the cut-off command is generated and the step S116 is followed by the step S118. In a next step S119, it is judged whether the calculated clamping force $F(i)$ exceeds the desired clamping force cFc. If the calculated clamping force is equal to or greater than the desired clamping force, a cut-off command is generated in a step S120 and the shut-off valve 12 is closed.

As stated above, in the present embodiment, the increment of the rotation angle of the main spindle has been detected to be equal to or smaller than the predetermined threshold value As, it is judged that the fastening member has been firmly set with respect to the substance to be clamped, and the calculation of the clamping force is initiated. Therefore, any variation of the torque of the main spindle prior to the actual clamping is not calculated as the clamping force, so that the clamping force can be calculated very accurately and the final clamping force can be made very close to the desired clamping force.

Figure 31:
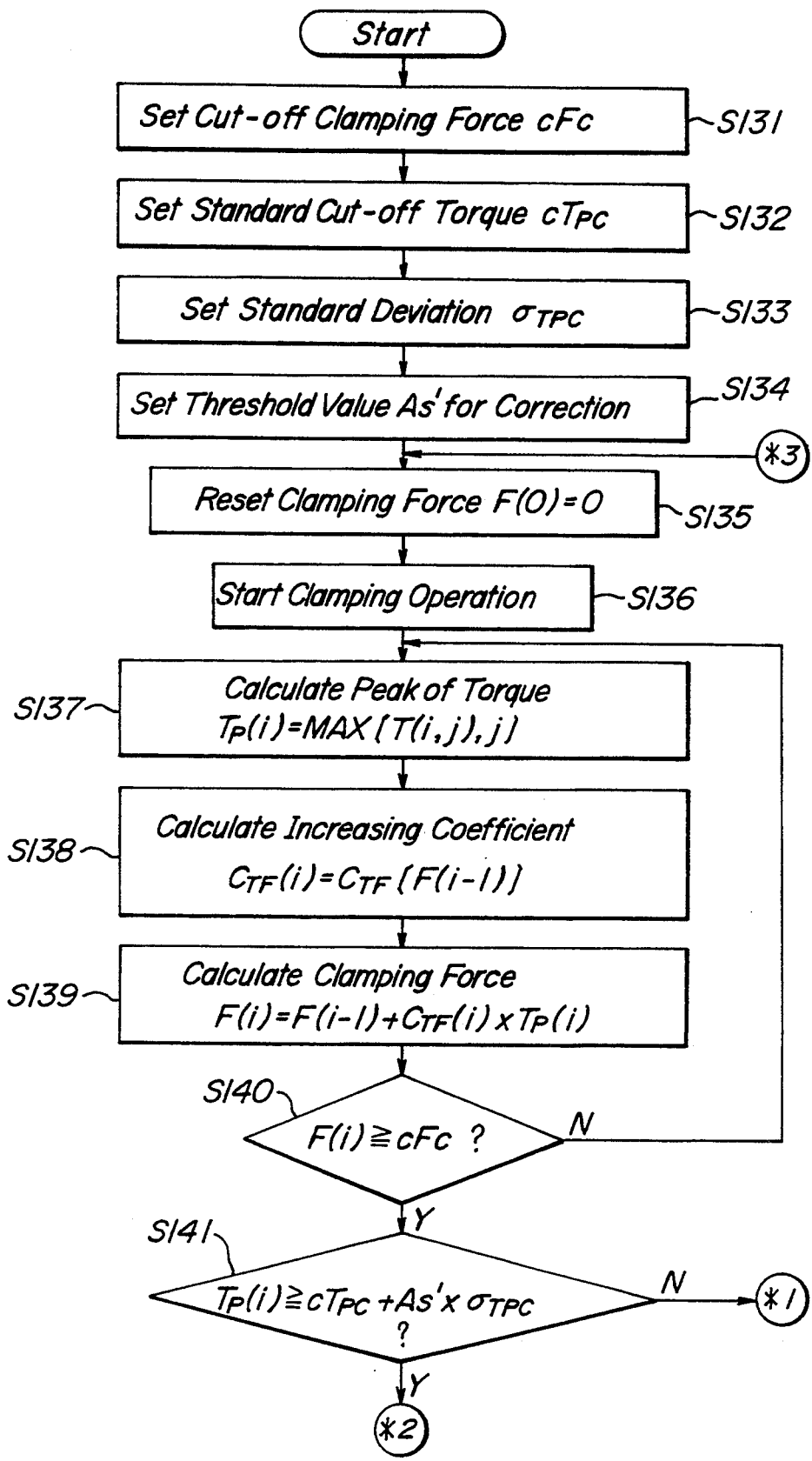
FIGS. 31 and 32 are flow charts representing the operation of another embodiment of the impact wrench according to the invention.
Figure 32:
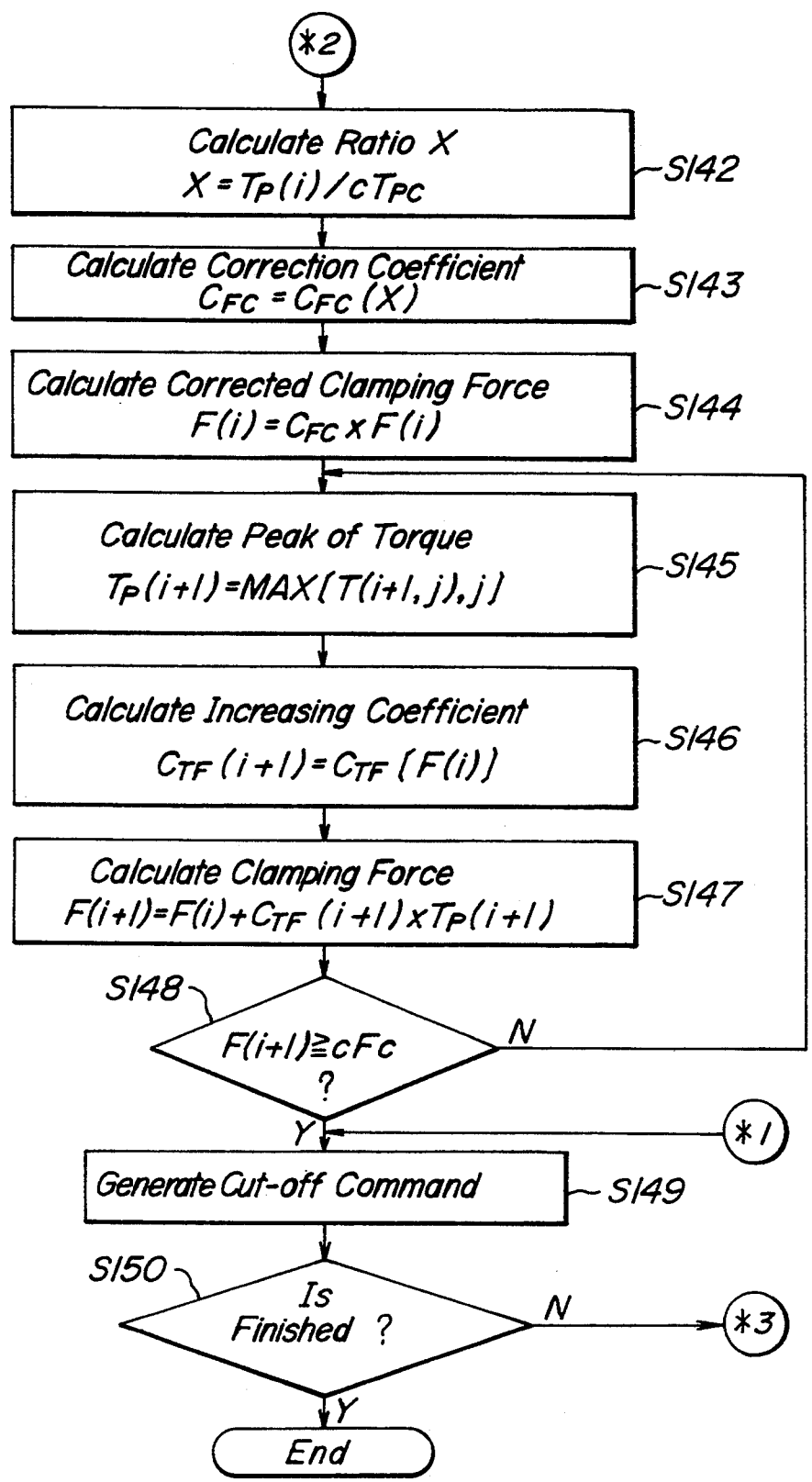

FIGS. 31 and 32 are flow charts showing the operation of an embodiment of the impact wrench according to the fifth aspect of the invention. Marks *1, *2 and *3 in FIG. 31 are continued to the same marks in FIG. 32. In the present embodiment, the rotation angle of the main spindle 15 is not detected, so that the main body of the impact wrench has the same construction as that shown in FIG. 2. In the present embodiment, after the calculated clamping force $F(i)$ has exceeded the cut-off clamping force cFc, a peak value of a pulsatory torque applied to the main spindle 15 is compared with a predetermined normal range, and when the peak value is out of the normal range, i.e. greater than the normal range, it is predicted that the actual clamping force might be smaller than the calculated clamping force. Then, a correction coefficient is derived in accordance with a deviation of the peak value of the pulsatory torque from a center value of the normal range and the calculated clamping force is corrected in accordance with the correction coefficient corresponding to the said deviation.

In a first step S131, the desired clamping force cFc is set as the cut-off clamping force. Next, in a step S132, a standard cut-off torque $cT_{PC}$ is set. This standard cut-off torque may be determined experimentally. In a next step S133, a standard deviation of cut-off torque $\sigma_{TPC}$ is set, and in a step S134 a threshold value As' is set, said threshold value being used for judging whether the correction is required or not. In a next step S135, the initial clamping force $F(O)=0$ is set and then, the clamping operation is started in a step S136. Steps S137 to S140 constitute a loop and every time an impact is applied, the operation along the loop is carried out. In the step S137, a peak value $T_p(i)$ is extracted from a plurality of samples contained in the torque signal and the thus extracted peak value is stored. In a next step S138, an increasing coefficient $C_{TF}(i)$ for the clamping force $F(i-1)$ is calculated on the basis of the data stored in the memory 34. In a step S139, the clamping force $F(i)$ is calculated by adding to the previously accumulated clamping force $F(i-1)$ an increment of the clamping force, i.e. a product of $T_p(i)$ and $C_{TF}(i)$. In a next step S140, it is judged that the thus calculated clamping force $F(i)$ exceeds the desired clamping force cFc or not. If $F(i)$ is equal to or greater than cFc, then in a step S141, it is judged whether the peak value $T_p(i)$ for the relevant impact exceeds a value of $cT_{PC} + As' \times \sigma_{TPC}$ or not. If the peak value does not exceed said value, the operation proceeds to a step S149 and the cut-off command is generated, and the shut-off valve 12 is closed thereby. In this manner, the clamping operation is completed. In the step S141, if the peak value is equal to or larger than said value, that is to say, if it is predicted that the peak value $T_p(i)$ of the pulsatory torque is too large to introduce an error in the calculated clamping force $F(i)$, in a step S142, a ratio X of the peak value $T_p(i)$ with respect to the standard cut-off torque $cT_{PC}$ is calculated. Next, in a step S143, a correction coefficient $C_{FC}$ is calculated in accordance with the ratio X. It should be noted that the correction coefficient $C_{FC}$ is always smaller than 1.

Next, in a step S144, the corrected clamping force $F(i)$ is calculated as $F(i) = C_{FC} \times F(i)$. Since the correction coefficient $C_{FC}$ is smaller than 1, the corrected clamping force $F(i)$ could not be larger than the desired clamping force cFc, so that the clamping operation is further continued. In steps S145 to S147, the operation carried out in the steps S137 to S140 is repeated for a next impact and the corrected clamping force $F(i)$ is calculated in the step S147. In a next step S148, the corrected clamping force $F(i)$ is compared with the desired clamping force cFc and if the corrected clamping force is judged to be larger than the cut-off clamping force cFc, in a step S149, a cut-off command is generated and the shut-off valve 12 is closed. In this manner, the clamping operation is completed.

Now a modification of the impact wrench of the embodiment explained with reference to FIGS. 31 and 32 will be explained. In this modification, in the step S146, the increasing coefficient $C_{TF}(i+1)$ is calculated as a product of the increasing coefficient $C_{TF}[F(i)]$ and the correction coefficient $C_{FC}$ which is calculated in the step S143. That is to say, the increasing coefficient is also corrected in accordance with the correction coefficient CFC. Then, the step S147 may be expressed as follows.

$$C_{TF}(i+1) = C_{TF}[F(i)] \times C_{FC} \qquad (9)$$

Figure 33:
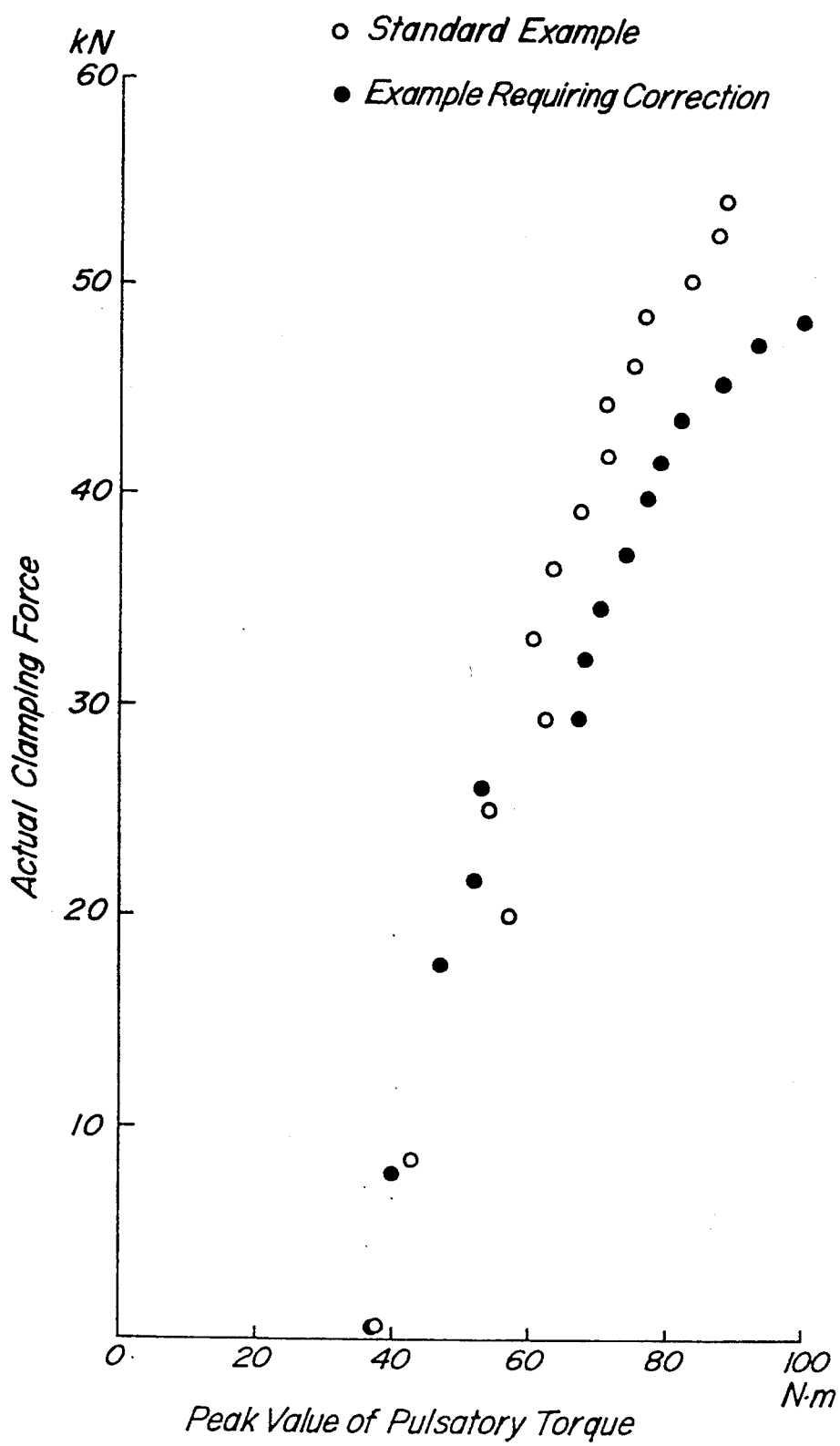
FIG. 33 is a graph showing a relationship between the actual clamping force and the peak value of the pulsatory torque.
Figure 34:
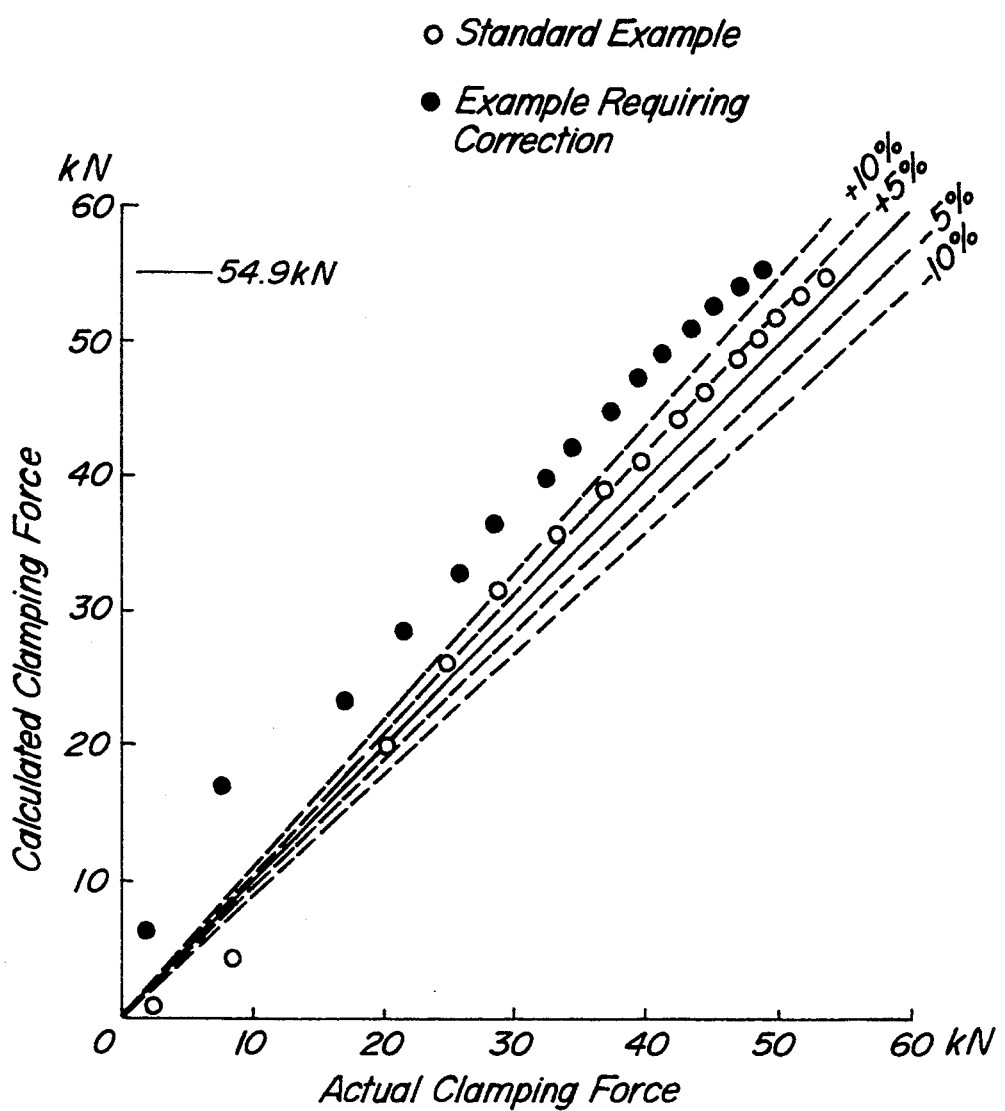
FIG. 34 is a graph illustrating a relationship between the calculated clamping force and the actual clamping force.

Now several experimental results will be explained with reference to FIGS. 33 to 35. FIG. 33 is a graph showing a relationship between the peak value of the pulsatory torque and the actually measured clamping force, and FIG. 34 is a graph representing a relationship between the actual clamping force and the calculated clamping force. In FIGS. 33 and 34, ○ denotes a standard example and ● represents an example which requires the correction. In the example requiring the correction, the calculated clamping force is greater than the actual clamping force by more than +10%. FIG. 35 is a graph showing the relationship between the actual clamping force and the calculated clamping force. In FIG. 35, ● represents the example which requires the correction and Δ denotes the example in which the correction shown in FIGS. 31 and 32 was performed. In this case, the threshold value As' was set to 2 and the correction coefficient $C_{FC}$ was calculated as $C_{FC} = 1/X$. In FIG. 35, Δ denotes an example in which the increasing coefficient is also corrected in the manner explained in the above mentioned modification. From FIG. 35, it can be clearly understood that when the correction is carried out, the calculated clamping force can be corrected and an error of the calculated clamping force can be reduced smaller than 5%. Particularly, in the second example, the error of the calculated clamping force can be reduced very small and the calculated clamping force is substantially identical with the actual clamping force, so that the control of the clamping force can be preformed very precisely.

The present invention is not limited to the embodiments explained above, but many modifications and alternations may be conceived by those skilled in the art within the scope of the invention. For instance, the embodiments shown in FIGS. 26, 27 and FIGS. 31, 32 may be also applied to the nut runner like as the embodiment shown in FIG. 9. Further, in the above embodiments, the motor unit is formed by the air motor unit, but it may be formed by an electric motor unit.

What is claimed is:

1. An impact type clamping apparatus comprising:
   a motor unit for generating a pulsatory driving torque;
   a switching means for switching on and off said motor unit;
   a main spindle driven by said pulsatory driving torque generated by said motor unit for rotating a fastening member;
   a torque detecting means for detecting a pulsatory torque applied to said main spindle to produce a torque signal;
   a calculating means for receiving said torque signal and calculating a clamping force in accordance with a peak value of a pulsatory torque applied to the main spindle and detected by said torque detecting means and a dependency of an increasing coefficient which represents an increasing rate of a clamping force applied to the fastening member by a unit amount of said peak value of the pulsatory torque upon said clamping force to derive a calculated clamping force; and
   a controlling means for performing a predetermined control in accordance with said calculated clamping force generated by said calculating means.

2. An apparatus according to claim 1, wherein said controlling means supplies a cut-off command to said switching means for making said motor unit off when said calculated clamping force exceeds a predetermined clamping force.

3. An apparatus according to claim 2, further comprising at least one of a display unit for displaying said calculated clamping force, a display unit for displaying said peak value of the pulsatory torque and a display unit for displaying a result of a judgment for judging whether the calculated clamping force has exceeded said desired clamping force.

4. An apparatus according to claim 2, wherein said motor unit comprises an air motor which is driven by a compressed air supplied from a compressed air supply source and an oil pressure pulse generating unit for converting an output torque into said pulsatory driving torque, and said switching means comprises a shut-off valve provided in a conduit between said compressed air supply source and said air motor.

5. An apparatus according to claim 1, wherein said calculating means comprises a memory for storing a function representing said dependency of the increasing coefficient upon said clamping force, and a calculating circuit for calculating increments of the clamping force due respective pulsatory torques in accordance with said function and accumulating said increments to produce said calculated clamping force.

6. An apparatus according to claim 5, wherein said memory stores a plurality of functions representing a plurality of dependencies for a plurality of combinations of fastening members and substances to be clamped thereby and a desired one of said plurality of functions is selectively used to derive said calculated clamping force.

7. An apparatus according to claim 2, wherein said controlling means derives a difference between said calculated clamping force and said desired clamping force, and supplies said cut-off command to said switching means to make the operation of said motor unit off after it has been judged that said calculated clamping force which has been obtained by an application of a relevant pulsatory torque exceeds said desired clamping force by an application of a next pulsatory torque, said cut-off command being produced at a timing which is determined in accordance with said difference.

8. An apparatus according to claim 7, wherein said controlling means compares said difference between said calculated clamping force and said desired clamping force with an increment of the clamping force which will be produced by a next impact, and when it is judged that said difference will be equal to or smaller than said increment, the controlling means initiates to calculate said timing at which said cut-off command is generate.

9. An apparatus according to claim 8, wherein said increment of the clamping force is set to an increment $\delta F(i)$ which is obtained by the relevant pulsatory torque.

10. An apparatus according to claim 9, wherein said increment of the calculated clamping force is set to 0.7 to 0.9 of said increment $\delta F(i)$.

11. An apparatus according to claim 9, wherein said timing $T_d$ at which said cut-off command is generated is determined in accordance with an equation of $$T_d = T_0 + T_C \times F_N(i),$$

where $T_0$ is a delay time including a delay in the calculating means and controlling means and a delay in the switching means, $T_C$ is a proportional constant and $F_N(i)$ is said difference between said calculated clamping force and said desired clamping force.

12. An apparatus according to claim 2, wherein said apparatus further comprises an adjusting means for adjusting a magnitude of said pulsatory driving torque generated by said motor unit, and said controlling means derives a difference between said calculated clamping force and a desired clamping force, supplies a first command to said adjusting means such that the pulsatory torque generated by said motor unit is reduced, when it is judged that said difference becomes smaller than a predetermined value, and supplies a second command as said cut-off command to said switching means to make the operation of said motor unit off when the calculated clamping force exceeds said desired value.

13. An apparatus according to claim 12, wherein said motor unit comprises an air motor which is driven by a compressed air supplied from a compressed air supply source and an oil pressure pulse generating unit for converting an output torque into said pulsatory driving torque, said switching means comprises a shut-off valve provided in a conduit between said compressed air supply source and said air motor for stopping a supply of the compressed air to the air motor in response to said second command, and said adjusting means comprises a relief valve provided in said conduit for reducing a pressure of the compressed air supplied to the air motor in response to said first command.

14. An apparatus according to claim 12, wherein said motor unit comprises an air motor which is driven by a compressed air supplied from a compressed air supply source and an oil pressure pulse generating unit for converting an output torque into said pulsatory driving torque, said switching means comprises a shut-off valve provided in a conduit between said compressed air supply source and said air motor for stopping a supply of the compressed air to the air motor in response to said second command, and said adjusting means comprises a pressure adjusting valve provided in said conduit for reducing a pressure of the compressed air supplied to the air motor by changing a set-pressure in response to said first command.

15. An apparatus according to claim 14, wherein said set-pressure $P_{ACT}$ of the pressure regulating valve is determined by an equation of $$P_{ACT} = P_{ORG}[2 - 1.5 \times F(i)/cFc],$$

where $P_{ORG}$ is a pressure of the compressed air supply, $F(i)$ is the calculated clamping force and $cFc$ is the desired clamping force.

16. An apparatus according to claim 2, wherein said apparatus further comprises a rotation detecting means for detecting a rotation of said main spindle to produce a rotation signal and a judging means for processing said rotation signal to generate a calculation start signal when it is judged that a rotation of the main spindle due to an impact has become smaller than a predetermined threshold value, said calculating means starts a calculation of the clamping force in response to said calculation start signal, and said controlling means derives a difference between said calculated clamping force and said desired clamping force and supplies said cut-off command to said switching means to make the operation of said motor unit off when a calculated clamping force exceeds said desired clamping force.

17. An apparatus according to claim 2, wherein said controlling means performs a first judgment for judging whether or not said calculated clamping force exceeds a desired clamping force, performs a second judgment for judging whether or not a peak value of a pulsatory torque due to a relevant impact is out of a predetermined range, when it is judged that the calculated clamping force has exceeded the desired clamping force, derives a correction coefficient corresponding to a deviation of the peak value of the pulsatory torque from a center value of said predetermined range when it is judged that the peak value of the pulsatory torque is out of said predetermined range, corrects said calculated clamping force by said correction coefficient to derive a corrected clamping force, and supplies said cut-off command to said switching means to make the operation of said motor unit off when said corrected clamping force exceeds said desired clamping force.

18. An apparatus according to claim 17, wherein said controlling means corrects said calculated clamping force by multiplying the calculated clamping force by said correction coefficient.

19. An apparatus according to claim 18, wherein said correction coefficient is calculated from a ratio of the peak value of the pulsatory torque to said center value of said predetermined range.

20. An apparatus according to claim 17, wherein said increasing coefficient is corrected in accordance with said correction coefficient.

* * * * *